(12) United States Patent
Cao et al.

(10) Patent No.: US 11,763,498 B2
(45) Date of Patent: Sep. 19, 2023

(54) SYSTEMS AND METHODS FOR IMAGE RECONSTRUCTION

(71) Applicant: SHANGHAI UNITED IMAGING HEALTHCARE CO., LTD., Shanghai (CN)

(72) Inventors: Wenjing Cao, Shanghai (CN); Rengcai Yang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 106 days.

(21) Appl. No.: 17/096,936

(22) Filed: Nov. 12, 2020

(65) Prior Publication Data
US 2021/0082161 A1 Mar. 18, 2021

(30) Foreign Application Priority Data

Nov. 12, 2019 (CN) .......................... 201911101987.5
Nov. 12, 2019 (CN) .......................... 201911102058.6

(51) Int. Cl.
*G06T 11/00* (2006.01)
(52) U.S. Cl.
CPC .. *G06T 11/003* (2013.01); *G06T 2207/10072* (2013.01); *G06T 2211/40* (2013.01)
(58) Field of Classification Search
CPC ................ G06T 11/003; G06T 11/006; G06T 2207/10072; G06T 2211/40; G06T 2211/412
See application file for complete search history.

(56) References Cited

U.S. PATENT DOCUMENTS

2011/0150305 A1 6/2011 Zeng et al.
2012/0027281 A1* 2/2012 Jang ...................... G06T 11/006
382/131

(Continued)

FOREIGN PATENT DOCUMENTS

CN 107427274 A 12/2017
CN 109272562 A 1/2019

(Continued)

OTHER PUBLICATIONS

Deng, Kaifa et al., Computer Reconstruction Image Algorithm II—Series Expansion Method, Laser Technology and Application, 2002, 30 pages.

(Continued)

*Primary Examiner* — John Villecco
*Assistant Examiner* — Kathleen M Broughton
(74) *Attorney, Agent, or Firm* — METIS IP LLC

(57) ABSTRACT

A system for imaging reconstruction is provided. The system may obtain a first set of image data of a subject acquired by a scanner and a second set of image data of the subject acquired by the scanner. The first set of image data may correspond to a first angle range of the scanner. The second set of image data may correspond to a second angle range of the scanner. The first angle range may be different from the second angle range. The system may also generate a first image based on the first set of image data and generate a second image based on the second set of image data. The system may further generate a target image based on the first image and the second image.

18 Claims, 16 Drawing Sheets

(56) References Cited

U.S. PATENT DOCUMENTS

| | | | |
|---|---|---|---|
| 2014/0055135 A1* | 2/2014 | Nielsen | G01R 33/58 |
| | | | 324/309 |
| 2014/0369458 A1 | 12/2014 | Shen et al. | |
| 2016/0073974 A1* | 3/2016 | Saito | A61B 6/54 |
| | | | 378/98.2 |
| 2016/0364856 A1 | 12/2016 | Zheng et al. | |
| 2017/0119335 A1 | 5/2017 | Yamakawa et al. | |
| 2018/0315224 A1 | 11/2018 | Lou et al. | |
| 2020/0005498 A1 | 1/2020 | Wang | |

FOREIGN PATENT DOCUMENTS

| | | | | |
|---|---|---|---|---|
| CN | 109509235 A | * | 3/2019 | G06T 11/006 |
| CN | 109523605 A | | 3/2019 | |
| CN | 109565542 A | * | 4/2019 | G06F 3/147 |
| CN | 110136217 A | | 8/2019 | |
| EP | 3188122 A1 | * | 7/2017 | G06T 11/008 |
| KR | 20150099375 A | * | 8/2015 | |
| KR | 101598265 B1 | * | 2/2016 | |
| KR | 20180003400 A | | 1/2018 | |
| WO | 2011148277 A2 | | 12/2011 | |
| WO | WO-2018033003 A1 | * | 2/2018 | A61B 6/037 |

OTHER PUBLICATIONS

Tian, Xing-Fei et al., An Improved Discrete Algebraic Reconstruction Technique (DART), information Technology, 6: 92-96, 2013.

Chen, Zijia, Research on CT Image Reconstruction Algorithms Using Undersampled Projection Data, China Masters' Theses Full-text Database Medical and Health Science and Technology Series, 2018, 83 pages.

Gong, Changcheng et al., Image Reconstruction Model for Limited-angle CT Based on Prior image Induced Relative Total Variation, Applied Mathematical Modelling, 2019, 24 pages.

* cited by examiner

500

Obtaining a first set of image data of a subject acquired by a scanner, the first set of image data corresponding to a first angle range of the scanner — 501

Obtaining a second set of image data of the subject acquired by the scanner, the second set of image data corresponding to a second angle range of the scanner, — 502

Generating, based on the first set of image data, a first image — 503

Generating, based on the second set of image data, a second image — 504

Generating, based on the first image and the second image, a target image — 505

| Generating, based on a first image and a second image, a first intermediate image by performing an image arithmetic on the first image and the second image | 601 |

↓

| Generating the target image based on the first intermediate image and at least one of the first image or the second image | 602 |

```
┌─────────────────────────────────────────────────────┐
│ Obtaining a first set of image data of a subject    │  1101
│ acquired by a scanner, the first set of image data  │
│ corresponding to a first angle range of the scanner │
└─────────────────────────────────────────────────────┘
                          │
                          ▼
┌─────────────────────────────────────────────────────┐  1102
│ Obtaining a second set of image data of the subject │
│ acquired by the scanner, the second set of image    │
│ data corresponding to a second angle range of the   │
│ scanner,                                            │
└─────────────────────────────────────────────────────┘
                          │
                          ▼
┌─────────────────────────────────────────────────────┐  1103
│ Generating, based on the first set of image data    │
│ and the second set of image data, a target image    │
└─────────────────────────────────────────────────────┘
```

| 1201 |
|---|
| Obtaining a set of image data of a subject acquired by a detector of a scanner, the set of image data corresponding to an angle range of the scanner, the set of image data including multiple groups each of which is acquired by a portion of detection units in the detector |

| 1202 |
|---|
| Determining a weight parameter corresponding to the angle range based on positions of the detection units in the detector of the scanner and/or the angle range, the weight parameter including multiple elements each of which corresponds to one of the multiple groups of the image data |

| 1203 |
|---|
| Generating, based on the weight parameter corresponding to the angle range and the set of image data, an image |

FIG. 12

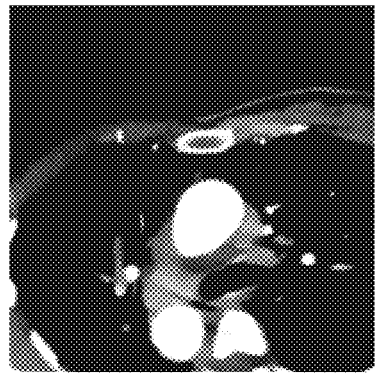
Image 1
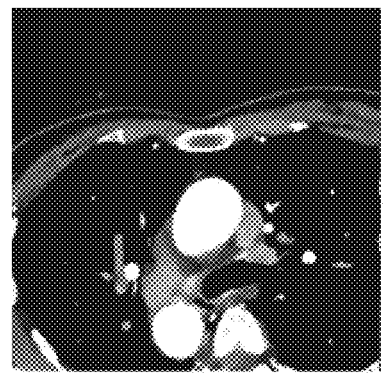
Image 2
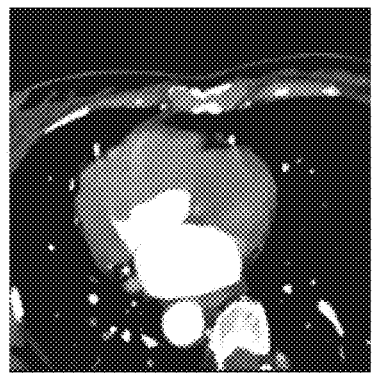
Image 3
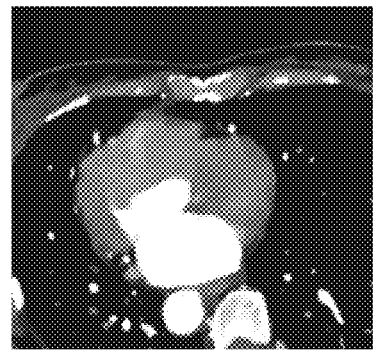
Image 4
FIG. 18

SYSTEMS AND METHODS FOR IMAGE RECONSTRUCTION

CROSS-REFERENCE TO RELATED APPLICATIONS

This application claims priority to Chinese Patent Application No. 201911102058.6, filed on Nov. 12, 2019, and Chinese Patent Application No. 201911101987.5, filed on Nov. 12, 2019, the content of which is hereby incorporated by reference.

TECHNICAL FIELD

The present disclosure generally relates to image processing, and more particularly, relates to systems and methods for image reconstruction.

BACKGROUND

Medical imaging technology has been widely used in medical diagnosis and medical treatment. Generally, an imaging device (e.g., a computed tomography (CT) device) may be used to scan the subject and receive imaging data (e.g., projection data) of a subject (e.g., a patient) or a portion thereof, and an image is reconstructed based on the imaging data of the subject or the portion thereof. In some conditions, the imaging device or a portion thereof may rotate a larger angle (e.g., 360 degrees, i.e., a circle) around the subject during a scan to obtain the imaging data and the image reconstructed based on the imaging data has a lower time resolution. In some embodiments, the imaging device may rotate a smaller angle (e.g., 240 degrees) for one or more times to obtain one or more sets of imaging data, and the image reconstructed based on the one or more sets of image data has a higher time resolution. However, since the subject may undergo a physiological motion, the one or more sets of imaging data corresponding to different scans of the imaging device may be inconsistent, thereby causing a motion artifact represented in the reconstructed image. Therefore, it is desirable to provide effective systems and methods for reconstructing a target image of the subject with a high time resolution and a low motion artifact.

SUMMARY

According to one aspect of the present disclosure, a system for image reconstruction is provided. The system may include at least one storage device including a set of instructions, and at least one processor configured to communicate with the at least one storage device. When executing the set of instructions, the at least one processor may be configured to direct the system to obtain a first set of image data of a subject acquired by a scanner and a second set of image data of the subject acquired by the scanner. The first set of image data may correspond to a first angle range of the scanner. The second set of image data may correspond to a second angle range of the scanner. The first angle range may be different from the second angle range. The at least one processor may be also configured to direct the system to generate a first image based on the first set of image data and generate a second image based on the second set of image data. The at least one processor may be further configured to direct the system to generate a target image based on the first image and the second image.

In some embodiments, the first image may be generated based on the first set of image data via a first iterative process including performing a first count of iterations, and the second image may be generated based on the second set of image data via a second iterative process including performing a second count of iterations. The first count of iterations may exceed or equal the second count of iterations.

In some embodiments, the at least one processor may be configured to direct the system to obtain image data of the subject acquired by a radiation source of the scanner rotating an angle range. The first angle range and the second angle range may be portions of the angle range. The first set of image data and the second set of image data may be portions of the image data.

In some embodiments, the at least one processor may be configured to direct the system to generate a first intermediate image by performing an image arithmetic between the first image and the second image, and generate the target image based on the first intermediate image and at least one of the first image or the second image.

In some embodiments, the at least one processor may be configured to direct the system to generate a second intermediate image based on a noise distribution adjustment operation and the first intermediate image, and generate the target image based on the first image and the second intermediate image.

In some embodiments, the at least one processor may be configured to direct the system to obtain a weighting parameter corresponding to the first intermediate image, and generate the second intermediate image by multiplying the weighting parameter and the first intermediate image. The weighting parameter may include a plurality of elements each of which corresponds to a pixel of the first intermediate image.

In some embodiments, the at least one processor may be configured to direct the system to generate a third intermediate image by processing the first intermediate image using a high-pass filter, and generate the second intermediate image by performing the noise distribution adjustment operation on the third intermediate image.

In some embodiments, the at least one processor may be configured to direct the system to generate a fourth intermediate image by performing a blurring operation on the first intermediate image, generate a fifth intermediate image by performing the image arithmetic between the first intermediate image and the fourth intermediate image. The at least one processor may be configured to direct the system to generate the second intermediate image by performing the noise distribution adjustment operation on the fifth intermediate image.

In some embodiments, the blurring operation may include a total variation (TV) denoising operation.

In some embodiments, the image arithmetic may include at least one of an addition operation, an image subtraction operation, a multiplication operation, or a division operation.

In some embodiments, a time resolution corresponding to the first image may exceed a time resolution corresponding to the second image and a time resolution corresponding to the target image may exceed the time resolution corresponding to the second image.

In some embodiments, a noise level of the first image may be less than a noise level of the second image and a noise level of the target image is less than the noise level of the second image.

In some embodiments, a width of the second angle range may exceed a width of the first angle range.

According to another aspect of the present disclosure, a method for imaging reconstruction is provided. The method may include obtaining a first set of image data of a subject acquired by a scanner, and obtaining a second set of image data of the subject acquired by the scanner. The first set of image data may correspond to a first angle range of the scanner, and the second set of image data may correspond to a second angle range of the scanner. The first angle range may be different from the second angle range. The method may include generating a first image based on the first set of image data, and generating a second image based on the second set of image data. The method may include generating a target image based on the first image and the second image.

According still another aspect of the present disclosure, a non-transitory readable medium including at least one set of instructions is provided. When executed by at least one processor of a system for imaging reconstruction, the at least one set of instructions may direct the at least one processor to perform a method. The method may include obtaining a first set of image data of a subject acquired by a scanner, and obtaining a second set of image data of the subject acquired by the scanner. The first set of image data may correspond to a first angle range of the scanner, and the second set of image data may correspond to a second angle range of the scanner. The first angle range may be different from the second angle range. The method may include generating a first image based on the first set of image data, and generating a second image based on the second set of image data. The method may include generating a target image based on the first image and the second image.

According to one aspect of the present disclosure, a system for image reconstruction is provided. The system may include at least one storage device including a set of instructions, and at least one processor configured to communicate with the at least one storage device. When executing the set of instructions, the at least one processor may be configured to direct the system to obtain a set of image data of a subject acquired by a detector of a scanner, the set of image data corresponding to an angle range of the scanner. The at least one processor may be also configured to determine a weight parameter corresponding to the angle range based on at least one of positions of the detection units in the detector of the scanner or the angle range. The at least one processor may be further configured to direct the system to generate, based on the weight parameter corresponding to the angle range and the set of image data, an image.

In some embodiments, the positions of the detection units are defined by a cone angle of each row of detection units. The at least one processor may be configured to direct the system determine a correction factor corresponding to the set of image data based on the cone angle of each row of detection units, the correction factor including multiple weighted values each of which corresponds to a portion of the set of image data acquired by one or more rows of detection units, and determine the weight parameter based on the correction factor, the weighted value is positively related to the cone angle of the one or more rows of detection units.

In some embodiments, the angle range include multiple data acquisition angles. The at least one processor may be configured to direct the system to determine a correction factor corresponding to the set of image data based on the cone angle of each row of detection units. The at least one processor may be configured to direct the system to determine the correction factor corresponding to the set of image data based on the cone angle of each row of detection units and a difference between the data acquisition angle and a center angle in the angle range, the weighted value is negatively related to the data acquisition angle and the center angle in the angle range.

In some embodiments, the at least one processor may be configured to direct the system to determine a first sub-range in the angle range based on the cone angle of each row of detection units. The at least one processor may be configured to direct the system to determine a first sub-range in the angle range based on the cone angle of each row of detection units. The at least one processor may be also configured to direct the system to determine a second sub-range in the angle range based on the first sub-range and the center angle of the angel range. The at least one processor may be also configured to direct the system to determine a weighted value in the correction factor corresponding to the data acquisition angle in the angle range based on the second sub-range.

In some embodiments, the weighted value in the correction factor corresponding to the data acquisition angle that does not exceed the first sub-range exceeds the weighted value in the correction factor corresponding to the data acquisition angle that exceeds the first sub-range exceeds.

In some embodiments, the at least one processor may be configured to direct the system to obtain a preliminary weighting parameter. The at least one processor may be also configured to direct the system to adjust the preliminary weighting parameter based on the correction factor to obtain the weighting parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for generating a target image according to some embodiments of the present disclosure;

FIG. 6 is a flowchart illustrating an exemplary process for generating a target image according to some embodiments of the present disclosure;

FIG. 11 is a flowchart illustrating an exemplary process for generating a target image according to some embodiments of the present disclosure;

FIG. 12 is a flowchart illustrating an exemplary process for image reconstruction according to some embodiments of the present application;

FIG. 18 illustrates reconstructed images according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
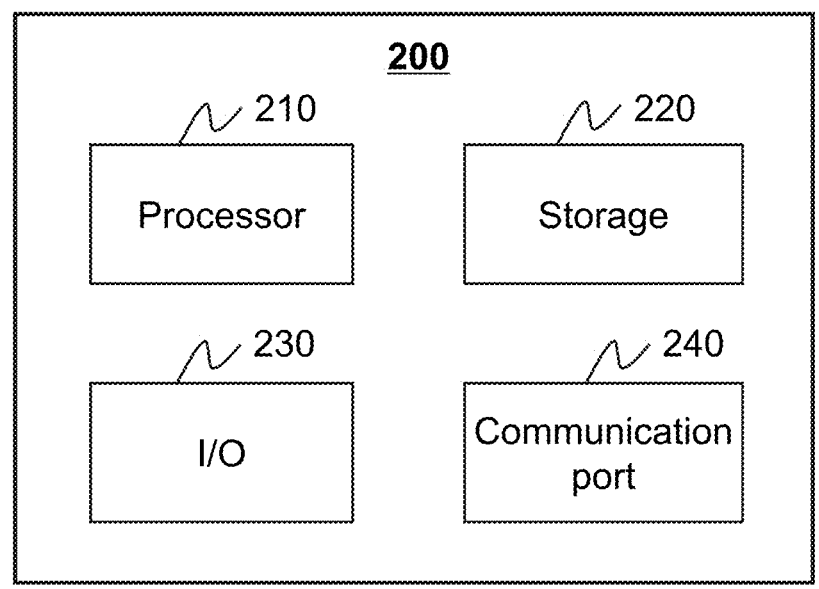
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for image reconstruction, such as for disease diagnostic or research purposes. In some embodiments, the systems may include a single modality imaging system and/or a multi-modality imaging system. The single modality imaging system may include, for example, an ultrasound imaging system, an X-ray imaging system, a CT system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near infrared spectroscopy (NIRS) imaging system, a computed radiography (CR) imaging system, a digital radiography (DR) imaging system, a digital subtraction angiography (DSA) imaging system, an emission computed tomography (ECT) imaging system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of a subject. The subject may include a biological object and/or a non-biological object. The biological object may be a human being, an animal, a plant, or a portion thereof (e.g., a cell, a tissue, an organ, etc.). In some embodiments, the subject may be a man-made composition of organic and/or inorganic matters that are with or without life.

An aspect of the present disclosure relates to systems and methods for image reconstruction. The systems and methods may obtain a first set of image data of a subject acquired by a scanner and a second set of image data of the subject acquired by the scanner. The first set of image data may correspond to a first angle range of the scanner, and the second set of image data may correspond to a second angle range of the scanner. The first angle range may be different from the second angle range. The systems and methods may generate a first image based on the first set of image data, and generate a second image based on the second set of image data. The systems and methods may further generate a target image based on the first image and the second image.

Generally, if the subject undergoes a physiological motion, the image data of the subject corresponding to different angles of the imaging device (e.g., the scanner) may be inconsistent, thereby causing a motion artifact. Based on a set of image data of the subject corresponding to a limited angle range of the scanner (also referred to as a smaller angle range), the image reconstructed through an iterative reconstruction algorithm may have more motion artifacts than the image reconstructed through a filtered back projection (FBP) algorithm. Taking the heart undergoing a cardiac motion as an example, a time resolution may be a vital index in cardiac imaging. To reconstruct an image of the heart with a high time resolution, the set of image data corresponding to the limited angle range may be required, which may result in an insufficient image data. That is to say, more image data of the subject may be required to improve the image quality.

According to some embodiments of the present disclosure, the second angle range may include more data acquisition angles than the first angle range. Thus, the second set of image data corresponding to the second angle range may obtain sufficient image data and have non-directional noise distribution. In addition, the first set of image data require a shorter scanning time (or data acquisition time) than the second set of image data. Therefore, the first image may have a higher time resolution than the second image. Additionally, the systems and methods may generate the first image based on the first set of image data via a first iterative process including performing a first count of iterations, and generate the second image based on the second set of image data via a second iterative process including performing a second count of iterations. The first count of iterations may exceed or equal the second count of iterations. The first iterative process and the second iterative process may be performed through an iterative reconstruction algorithm. In some embodiments, the systems and the methods may generate a first intermediate image by performing an image arithmetic on the first image and the second image. The processing device 140 may generate a second intermediate image by processing the first intermediate image through a filtering operation, an image denoising operation, a blurring operation, or the like, or a combination thereof, thereby reducing the noise of the second intermediate image and making the noise distribution therein more uniform. The processing device 140 may generate the target image based on the second intermediate image and at least one of the first image or the second image. In this way, the target image may have a high time resolution, a high definition, and a low noise level.

Figure 1:
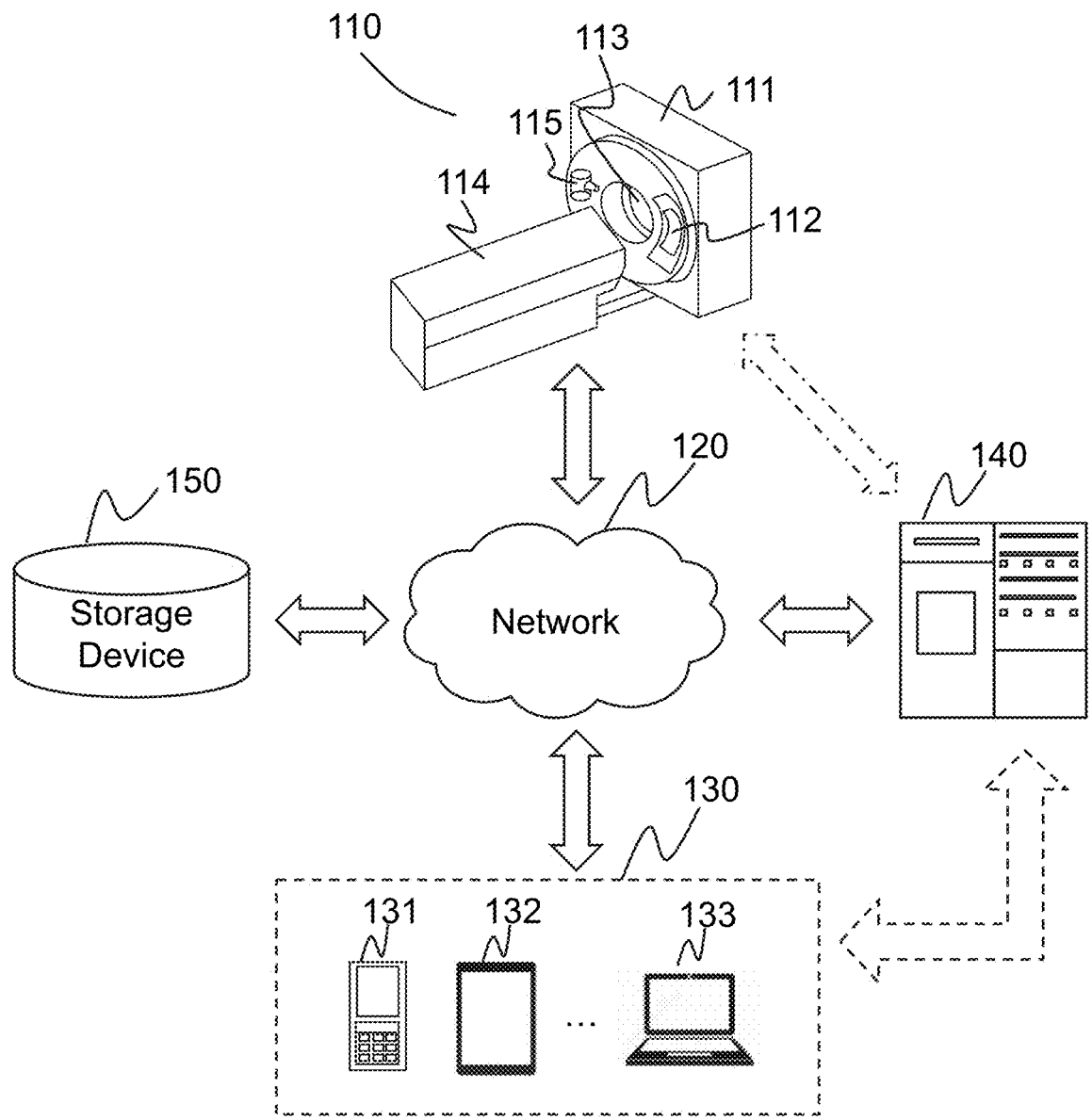
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include an imaging device 110, a network 120, one or more terminals 130, a processing device 140, and a storage device 150. In some embodiments, the imaging device 110, the terminal(s) 130, the processing device 140, and/or the storage device 150 may be connected to and/or communicate with each other via a wireless connection (e.g., the network 120), a wired connection, or a combination thereof. The connection between the components of the imaging system 100 may be variable. Merely by way of example, the imaging device 110 may be connected to the processing device 140 through the network 120, as illustrated in FIG. 1. As another example, the imaging device 110 may be connected to the processing device 140 directly. As a further example, the storage device 150 may be connected to the processing device 140 through the network 120, as illustrated in FIG. 1, or connected to the processing device 140 directly. As still a further example, a terminal 130 may be connected to the processing device 140 through the network 120, as illustrated in FIG. 1, or connected to the processing device 140 directly.

The imaging device 110 may generate or provide image data related to a subject via scanning the subject. In some embodiments, the subject may include a biological object and/or a non-biological object. For example, the subject may include a specific portion of a body, such as a head, a thorax, an abdomen, or the like, or a combination thereof. In some embodiments, the imaging device 110 may include a single-modality scanner (e.g., a CT scanner) and/or multi-modality scanner (e.g., a PET-CT scanner) as described elsewhere in this disclosure. In some embodiments, the image data relating to the subject may include projection data, one or more images of the subject, etc. The projection data may include raw data generated by the imaging device 110 by scanning the subject and/or data generated by a forward projection on an image of the subject.

In some embodiments, the imaging device 110 may include a gantry 111, a detector 112, a detecting region 113, a scanning table 114, and a radiation source 115. The gantry 111 may support the detector 112 and the radiation source 115. The gantry 111 may rotate, for example, clockwise or counterclockwise around a rotation axis of the gantry 111. The radiation source 115 and/or the detector 112 may rotate with the gantry 111. The subject may be placed on the scanning table 114 to be scanned. The radiation source 115 may emit radioactive rays to the subject. The radiation may include a particle ray, a photon ray, or the like, or a combination thereof. In some embodiments, the radiation may include a plurality of radiation particles (e.g., neutrons, protons, electron, p-mesons, heavy ions), a plurality of radiation photons (e.g., X-ray, a y-ray, ultraviolet, laser), or the like, or a combination thereof. The detector 112 may detect radiations and/or radiation events (e.g., gamma photons) emitted from the detecting region. In some embodiments, the detector 112 may include a plurality of detection units. The detector 112 may receive radioactive rays that pass through the subject, and convert the radioactive rays into visible light. The visible light may be converted into an electrical signal. The electrical signal may be converted into digital information through an analog/digital (A/D) converter. The digital information may be inputted into a computing device (e.g., a computer) for processing, or be transmitted to a storage device for storage. The detection units may include a scintillation detector (e.g., a cesium iodide detector) or a gas detector. The detection unit may be a single-row detector or a multi-rows detector.

The network 120 may include any suitable network that can facilitate the exchange of information and/or data for the imaging system 100. In some embodiments, one or more components of the imaging system 100 (e.g., the imaging device 110, the processing device 140, the storage device 150, the terminal(s) 130) may communicate information and/or data with one or more other components of the imaging system 100 via the network 120. For example, the processing device 140 may obtain image data from the imaging device 110 via the network 120. As another example, the processing device 140 may obtain user instruction(s) from the terminal(s) 130 via the network 120.

The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may be connected to and/or communicate with the imaging device 110, the processing device 140, and/or the storage device 150. For example, the terminal(s) 130 may display the image of the subject. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. In some embodiments, the terminal(s) 130 may be part of the processing device 140.

The processing device 140 may process data and/or information obtained from the imaging device 110, the storage device 150, the terminal(s) 130, or other components of the imaging system 100. In some embodiments, the processing device 140 may be a single server or a server group. The server group may be centralized or distributed. For example, the processing device 140 may obtain a first set of image data corresponding to a first angle range of the imaging device and a second set of image data corresponding to a second angle range of the imaging device from the imaging device 110. As another example, the processing device 140 may generate a first image based on the first set of image data, and generate a second image based on the second set of image data. As still another example, the processing device 140 may generate a target image based on the first image and the second image.

In some embodiments, the processing device 140 may be local to or remote from the imaging system 100. For example, the processing device 140 may access information and/or data from the imaging device 110, the storage device 150, and/or the terminal(s) 130 via the network 120. As another example, the processing device 140 may be directly connected to the imaging device 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 200 having one or more components as described in connection with FIG. 2.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 150 may store data, instructions, and/or any other information. In some embodiments, the storage device 150 may store data obtained from the processing device 140, the terminal(s) 130, and/or the imaging device 110. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing device 140, the terminal(s) 130). One or more components of the imaging system 100 may access the data or instructions stored in the storage device 150 via the network 120. In some embodiments, the storage device 150 may be part of the processing device 140.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

FIG. 2 is a schematic diagram illustrating exemplary hardware and/or software components of a computing device 200 according to some embodiments of the present disclosure. The computing device 200 may be used to implement any component of the imaging system 100 as described herein. For example, the processing device 140 and/or the terminal 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the imaging device 110, the terminal(s) 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal(s) 130, the storage device 150, and/or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 to execute to generate a target image of the subject.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 120) to facilitate data communications. The communication port 240 may establish connections between the processing device 140 and the imaging device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
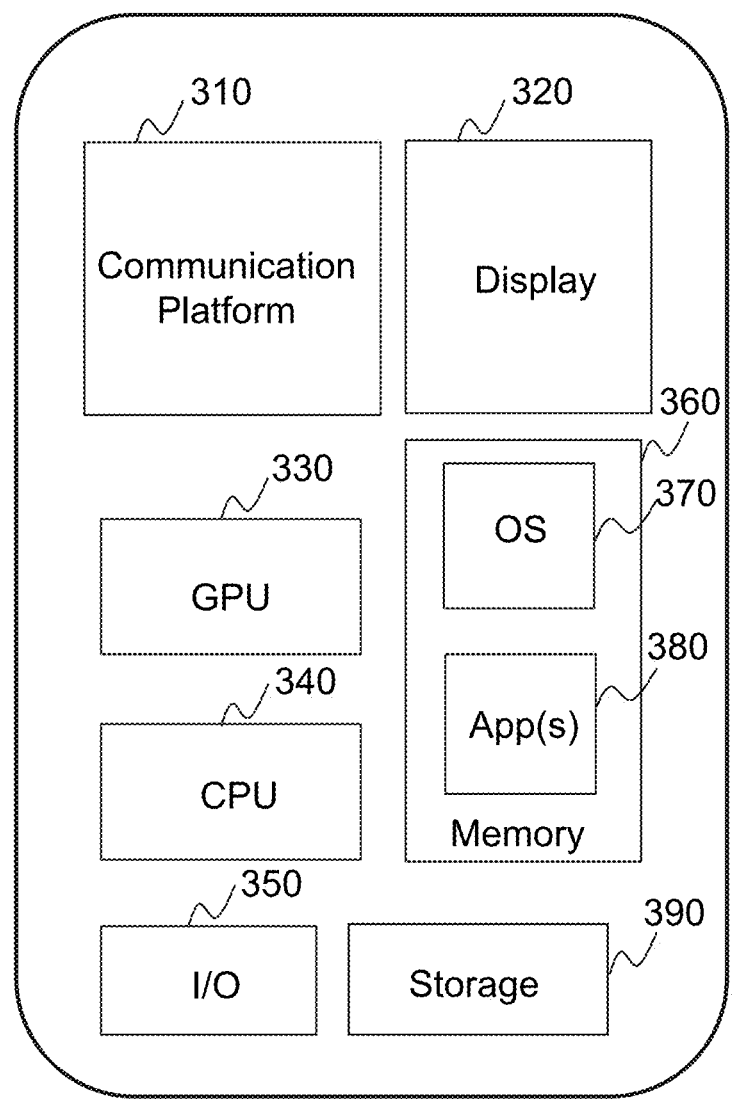
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
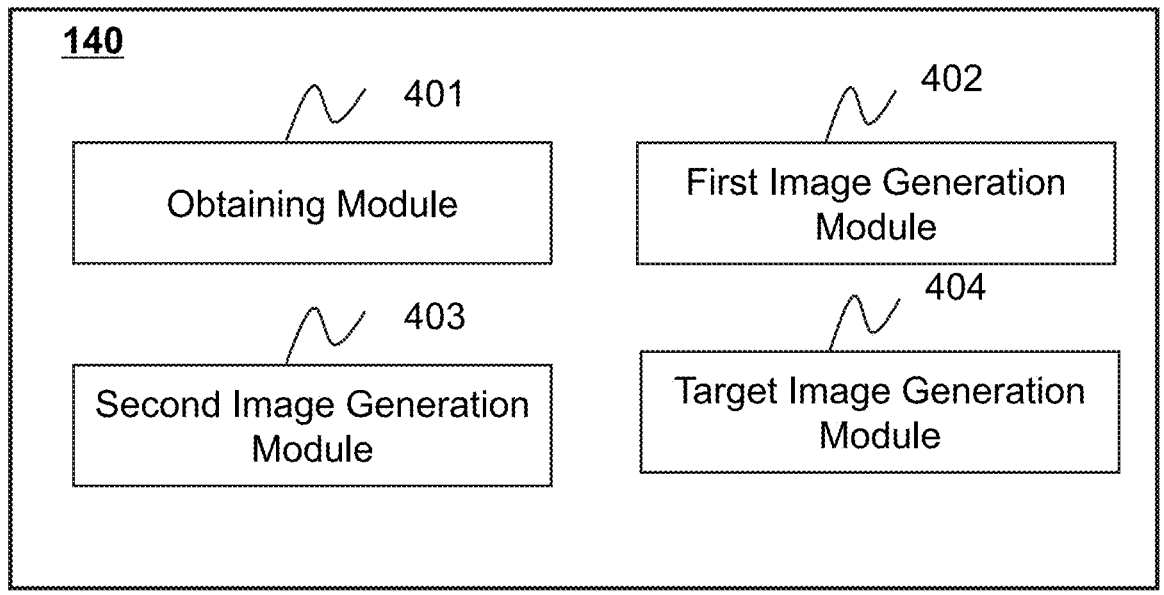
FIG. 4A is a block diagram illustrating an exemplary processing device according to some embodiments of the present disclosure.

FIG. 4A is a block diagram illustrating an exemplary processing device 140 according to some embodiments of the present disclosure. As shown in FIG. 4A, the processing device 140 may include an obtaining module 401, a first image generation module 402, a second image generation module 403, and a target image generation module 404. In some embodiments, processing device 140 may be implemented on a computing device 200 (e.g., the processor 210) illustrated in FIG. 2 or a CPU 340 as illustrated in FIG. 3. Each of the modules described above may be a hardware circuit that is designed to perform certain actions, e.g., according to a set of instructions stored in one or more storage media, and/or any combination of the hardware circuit and the one or more storage media.

The obtaining module 401 may be configured to obtain a first set of image data of a subject (e.g., a patient) acquired by a scanner (e.g., the imaging device 110) and/or a second set of image data of the subject acquired by the scanner. The image data may be acquired by the scanner performing a scanning operation on the subject. During each scanning operation, the scanner may rotate an angle range and acquire the image data of the subject at a data acquisition time period. Each data acquisition time period may correspond to a specific angle range of the scanner. Thus, each data acquisition angle of the scanner may correspond to a specific set of image data of the subject. The first set of image data may correspond to a first angle range of the scanner, and the second set of image data may correspond to a second angle range of the scanner. The first angle range may be different from the second angle range. More descriptions regarding the obtaining of the first set of image data and the second set of image data may be found elsewhere in the present disclosure. See, e.g., operations 501 and 502 and relevant descriptions thereof.

The first image generation module 402 may be configured to generate a first image based on the first set of image data. The second image generation module 403 may be configured to generate a second image based on the second set of image data. In some embodiments, the first image may be reconstructed based on the first set of image data using a first reconstruction technique (or algorithm) and the second image may be reconstructed based on the second set of image data using a second reconstruction technique (or algorithm). Exemplary reconstruction techniques may include an iterative reconstruction technique, an analytic reconstruction technique, etc. The first reconstruction technique and the second reconstruction technique may be the same or different. In some embodiments, by using the iterative reconstruction technique, the first image may be generated based on the first set of image data via a first iterative process including performing a first count of iterations, and the second image may be generated based on the second set of image data via a second iterative process including performing a second count of iterations. In some embodiments, the first count of iterations may be the same or different from the second count of iterations. The first iterative process and the second iterative process may be performed through the same or different iterative reconstruction algorithm(s). More descriptions regarding the generation of the generation of the first image and the second image may be found elsewhere in the present disclosure. See, e.g., operations 503 and 504 and relevant descriptions thereof.

The target image generation module 404 may be configured to generate a target image based on the first image and the second image. In some embodiments, the target image generation module 404 may generate a first intermediate image by performing an image arithmetic between the first image and the second image. The target image generation module 404 may generate the target image based on the first intermediate image and at least one of the first image or the second image. For example, the target image generation module 404 may perform another image arithmetic between the first intermediate image and the first image to generate the target image. As another example, the target image generation module 404 may generate a second intermediate image by processing the first intermediate image through a filtering operation, an image denoising operation, a blurring operation, or the like, or a combination thereof, and generate the target image based on the second intermediate image and at least one of the first image and the second image. More descriptions regarding the generation of the target image may be found elsewhere in the present disclosure. See, e.g., operation 505 and relevant descriptions thereof.

In some embodiments, the modules may be hardware circuits of all or part of the processing device 140. The modules may also be implemented as an application or set of instructions read and executed by the processing device 140. Further, the modules may be any combination of the hardware circuits and the application/instructions. For example, the modules may be the part of the processing device 140 when the processing device 140 is executing the application/set of instructions.

It should be noted that the above description of the processing device 140 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may further include one or more additional modules, such as a storage module. Additionally or alternatively, one or more of the modules described above may be omitted. In addition, any module mentioned above may be implemented in two or more separate units. For example, the first image generation module 402 and the second image generation module 403 may be integrated into one module. As another example, two or more modules of the four modules may share the same storage module, or each of the four modules may be connected to its respective storage module.

Figure 4B:
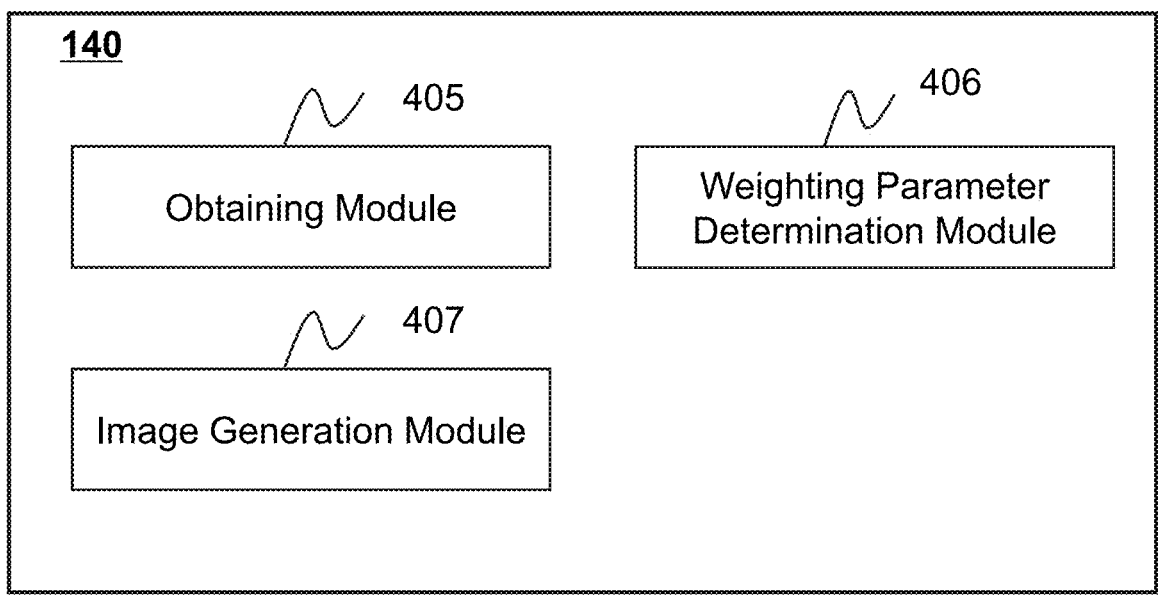
FIG. 4B is a block diagram illustrating an exemplary processing device according to some embodiments of the present disclosure.

FIG. 4B is a block diagram illustrating an exemplary processing device 140 according to some embodiments of the present disclosure. As shown in FIG. 4B, the processing device 140 may include an obtaining module 405, a weighting parameter determination module 406, and an image generation module 407. In some embodiments, processing device 140 may be implemented on a computing device 200 (e.g., the processor 210) illustrated in FIG. 2 or a CPU 340 as illustrated in FIG. 3. Each of the modules described above may be a hardware circuit that is designed to perform certain actions, e.g., according to a set of instructions stored in one or more storage media, and/or any combination of the hardware circuit and the one or more storage media.

The obtaining module 405 may be configured to obtain a set of image data of a subject acquired by a detector of a scanner. The set of image data may include projection data acquired by the multiple rows of the detection units of the detector when the scanner rotates in the angle range for one or more times (also referred to as data acquisition angles as described in FIG. 5). The angle range (i.e., the data acquisition angle or the width of the angle range) may be smaller or equal to a threshold, for example, 120 degrees, 150 degrees, 180 degrees, 240 degrees, etc. A smaller angle range may correspond to a shorter data acquisition time period such that the motion time of the subject is short, which is beneficial to reduce motion artifacts in reconstruction. In some embodiments, the set of image data may include multiple groups each of which is acquired by a portion of multiple detection units in the detector. The multiple detection units in the detector may arranged along the Z axis of the scanner in multiple rows. In some embodiments, the set of image data may include the first set of image data and/or the second set of image data as described in FIG. 5. More descriptions regarding the obtaining of the set of image data may be found elsewhere in the present disclosure. See, e.g., operations 501 and 502, operation 1201, and relevant descriptions thereof.

The weighting parameter determination module 406 may be configured to determine a weighting parameter corresponding to the angel range based on the positions of the detection units in the detector. The weighting parameter may be denoted as a matrix that including a plurality of elements. Each of the plurality of elements may also be referred to as a weighted value. The weighting parameter corresponding to the angle range may include at least one of a first item or a second item. The first item may include a first weighting coefficient associated with a noise statistical model. The second item may include a second weighting coefficient that is associated with the angle range and/or positions of detection units in the detector. In some embodiments, the weighting parameter may be a multiplication (e.g., Hadamard product) between the first item and the second item. In some embodiments, the weighting parameter may be an adjusted preliminary weighting parameter (i.e., the first item) based on the correction factor (i.e., the second item). More descriptions regarding the determining the weighting parameter may be found elsewhere in the present disclosure. See, e.g., operations operation 1202, and FIGS. 13-14, and relevant descriptions thereof.

The image generation module 407 may be configured to generate an image based on the weighting parameter corresponding to the angle range and the set of image data. After determining the weighting parameter corresponding to data acquisition angles in the angle range, the image generation module 407 may reconstruct the image based on the set of image data and the weighting parameter. For example, the image generation module 407 may weight the set of image data using the weighting parameter to obtain weighted image data and reconstruct the image based on the weighted image data using an image reconstruction technique as described elsewhere in the present disclosure (e.g., FIG. 5 and the descriptions thereof). More descriptions regarding the generating the image may be found elsewhere in the present disclosure. See, e.g., operations operation 1203, and relevant descriptions thereof.

In some embodiments, the modules may be hardware circuits of all or part of the processing device 140. The modules may also be implemented as an application or set of instructions read and executed by the processing device 140. Further, the modules may be any combination of the hardware circuits and the application/instructions. For example, the modules may be the part of the processing device 140 when the processing device 140 is executing the application/set of instructions.

It should be noted that the above description of the processing device 140 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may further include one or more additional modules, such as a storage module. Additionally or alternatively, one or more of the modules described above may be omitted. In addition, any module mentioned above may be implemented in two or more separate units. For example, two or more modules of the three modules may share the same storage module, or each of the four modules may be connected to its respective storage module.

FIG. 5 is a flowchart illustrating an exemplary process 500 for generating a target image according to some embodiments of the present disclosure. In some embodiments, process 500 may be executed by the imaging system 100. For example, the process 500 may be implemented as a set of instructions (e.g., an application) stored in a storage device (e.g., the storage device 150, the storage 220, and/or the storage 390). In some embodiments, the processing device 140 (e.g., the processor 210 of the computing device 200, the CPU 340 of the mobile device 300, and/or one or more modules illustrated in FIG. 4A) may execute the set of instructions and may accordingly be directed to perform the process 500.

In 501, the processing device 140 (e.g., the obtaining module 401) may obtain a first set of image data of a subject acquired by a scanner (e.g., the imaging device 110). The first set of image data may correspond to a first angle range of the scanner.

In 502, the processing device 140 (e.g., the obtaining module 401) may obtain a second set of image data of the subject acquired by the scanner. The second set of image data may correspond to a second angle range of the scanner.

As described above, the subject may include a biological object and/or a non-biological object. For example, the subject may include a patient or a portion thereof (e.g., an organ and a tissue of the body).

In some embodiments, the image data may include scan data generated by the scanner via scanning the subject, processed scan data generated by processing the scan data, etc. For example, the image data may include projection data of the subject that is generated by processing raw signal (e.g., CT values signal) detected by the scanner (e.g., the detector 112 of the imaging device 110) using an A/D converter. As another example, the image data may include the processed data that is generated by processing the projection data. In some embodiments, the processing device 140 may obtain the image data (e.g., the first set of image data and/or the second set of image data) from the scanner, the storage including the image data, an external resource (e.g., a medical image database), or the like. For example, the processing device 140 may obtain the projection data from the detector 112 of the imaging device 110.

The image data of the subject may be acquired by the scanner performing a scanning operation on the subject. When a scanning operation is performed, the scanner may rotate an angle range. As used herein, the angle range may be defined by a starting angle and an ending angle. The scanner rotating an angle range may refer to that the scanner rotates from the starting angle to the ending angle. The width of the angle range may be defined by a difference between the starting angle and the ending angle. The width of the angle range may also be referred to as a rotation angle of the scanner. In some embodiments, the starting angle, the ending angle, and/or the rotation angle may be in a range from 0 to 240 degrees, 0 to 360 degrees, 0 to 720 degrees, etc. For example, the image data may be acquired by the scanner during the scanner rotates from 0 degrees to 360 degrees for one time. The rotation angle of the scanner may be equal to 360 degrees. As another example, the image data may be acquired by the scanner during the scanner rotates from 0 degrees to 360 degrees for two times. The rotation angle of the scanner may be equal to 720 degrees. In some embodiments, when the scanner rotates the angle range, the radiation source of the scanner may continuously emit radioactive rays to the subject along with the rotation of the scanner and the detector of the scanner continuously detect radioactive rays. In some embodiments, when the scanner rotates the angle range, the radiation source of the scanner may discontinuously emit radioactive rays to the subject along with the rotation of the scanner and/or the detector may discontinuously detect radioactive rays. For example, during a total time period of the rotation of the scanner, the radiation source of the scanner may not emit radioactive rays to the subject and/or the detector may not detect radioactive rays at one or more time periods among the total time period. A time period that the radiation source of the scanner emits radioactive rays to the subject and the detector detects radioactive rays may also be referred to as a data acquisition period. The specific angle range and/or the rotation angle when the scanner rotate at a data acquisition period may be also referred to as a data acquisition angle. When the radiation source of the scanner continuously emit radioactive rays to the subject and the detector of the scanner continuously detect radioactive rays along with the rotation of the scanner, the rotation angle of the scanner may be the data acquisition angle. When the radiation source of the scanner discontinuously emit radioactive rays to the subject and the detector of the scanner discontinuously detect radioactive rays along with the rotation of the scanner, the data acquisition angle may be a portion of the rotation angle of the scanner.

Taking the imaging device 110 as an exemplary scanner, as described in FIG. 1, the gantry 111 and the radiation source 115 may rotate. In some embodiments, the angle range of the scanner may include an angle range that the radiation source 115 rotates during the scanning operation or an angle range that the gantry 111 rotates during the scanning operation. During each scanning operation, the radiation source 115 may rotate around the subject and emit radioactive rays to the subject at one or more certain time periods according to a scan protocol, and the detector 112 may detect the radiation rays passing through the subject to acquire the image data of the subject. Since the radiation source 115 rotates during the scanning operation, each data acquisition time period may correspond to a specific angle range of the scanner rotating and a rotation angle (i.e., the width of the specific angle range). In some embodiments, the data acquisition angle may include a rotation angle of the radiation source 115 at the data acquisition time period or a rotation angle of the gantry 111 at the data acquisition time period. Exemplary data acquisition angles (e.g., the rotation angles) may include 10°, 15°, 90°, 180°, etc. Thus, each data acquisition angle of the scanner may correspond to a specific set of image data of the subject. Since the scanning operation may include one or more data acquisition time periods, and each data acquisition time period may correspond to a specific data acquisition angle, the scanning operation may include one or more data acquisition angles. For example, the scanning operation of the imaging device 110 may correspond to an angle range, e.g., 0 to 360 degrees, 0 to 720 degrees, etc. The data acquisition angle may be 90 degrees to 240 degrees, 180 to 360 degrees, 0 to 360 degrees.

In some embodiments, the first set of image data and the second set of image data may be obtained in the same or different scanning operation(s). For example, the processing device 140 may obtain total image data of the subject acquired by a radiation source of the scanner rotating a total angle range in a scanning operation. The first angle range and the second angle range may be portions of the total angle range, and the first set of image data and the second set of image data may be portions of the image data. Among the image data corresponding to the angle range, the first set of image data may be a set of image data corresponding to the first angle range, and the second set of image data may be a set of image data corresponding to the second angle range. For instance, the scanner may rotate 360 degrees and the radiation source continuously emits radioactive rays during the rotation of the scanner. The first angle range may be from 90 degrees to 240 degrees and the second angle range may be from 180 degrees to 360 degrees. The first set of image data may be a portion of the total image data acquired when the scanner rotates from 90 degrees to 240 degrees and the second set of image data may be a portion of the total image data acquired when the scanner rotates from 180 degrees to 340 degrees.

As another example, the processing device 140 may obtain the first set of image data through a first scanning operation on the subject, and obtain the second set of image data through a second scanning operation on the subject. In some embodiments, the first scanning operation may be performed by the radiation source of the scanner rotating the first angle range, and the second scanning operation may be performed by the radiation source of the scanner rotating the second angle range. For instance, the scanner may rotate from 0 to 240 degrees and the radiation source continuously emits radioactive rays during the first scanning operation. The scanner may rotate from 0 to 360 degrees and the radiation source continuously emits radioactive rays during the second scanning operation. The first set of image data may be acquired when the scanner rotates from 0 degrees to 240 degrees and the second set of image data may be acquired when the scanner rotates from 0 degrees to 360 degrees.

The first angle range may be different from the second angle range. In some embodiments, the first angle range different from the second angle range may refer to that the width of the first angle range is different from the width of the second angle range. In some embodiments, the first angle range different from the second angle range may refer to that a total data acquisition angle of the first angle range is different from a total data acquisition angle of the second angle range. The total data acquisition angle of the first angle range may be equal to a sum of data acquisition angles in the first angle range and the total data acquisition angle of the second angle range may be equal to a sum of data acquisition angles in the second angle range.

In some embodiments, the second angle range may be greater than the first angle range. As used herein, the second angle range greater than the first angle range may refer to that the second angle range may include a greater total data acquisition angle than that of the first angle range. In other words, the second angle range may correspond to a longer data acquisition time than that of the first angle range. Merely by way of example, exemplary first angle ranges may include 90 to 240 degrees, 60 to 240 degrees, or 30 to 270 degrees, and corresponding exemplary second angle ranges may include 0 to 360 degrees, 60 to 720 degrees, or 0 to 720 degrees, respectively.

In some embodiments, the first angle range may be a portion of the second angle range. Merely by way of example, the first angle range may include 90 to 240 degrees, and the second angle range may include 0 to 360 degrees. In some embodiments, at least a portion of the first angle range may be overlapped with the second angle range. Merely by way of example, the first angle range may include 90 to 240 degrees, and the second angle range may include 180 to 360 degrees. In some embodiments, the first angle range may be not overlapped with the second angle range the second angle range. Merely by way of example, the first angle range may include 90 to 180 degrees, and the second angle range may include 181 to 360 degrees. It should be noted that the values of the first angle range and the second angle range described herein are merely provided for illustration, and are not limiting.

In some embodiments, the first angle range and/or the second angle range may be determined by a user according to an actual requirement, or according to a default setting of the imaging system 100. For example, two random angle ranges within an angle range of a scanning operation may be determined as the first angle range and the second angle range, and the image data corresponding to the two random angle ranges may be determined as the first and second sets of image data, respectively. As another example, the first angle range and/or the second angle range may be determined according to the subject for imaging. Merely by way of example, if the subject (e.g., a region of a patient (such as the heart, the lung, the rib, the enterocoelia, or the like)) undergoes a physiological motion, the processing device 140 may determine the data acquisition time period corresponding to a target phase of the physiological motion of the subject (e.g., when the cardiac motion is gentle), and then determine the data acquisition angle corresponding to the data acquisition time period based on the rotation speed of the scanner. The processing device 140 may determine the first angle range and/or the second angle range based on the data acquisition angle corresponding to the data acquisition time period. For example, the processing device 140 may determine the data acquisition angle as a middle angle between a starting angle and an ending angle of the first angle range or the second angle range.

In 503, the processing device 140 (e.g., the first image generation module 402) may generate a first image based on the first set of image data.

In 504, the processing device 140 (e.g., the first image generation module 403) may generate a second image based on the second set of image data.

In some embodiments, the first image may be reconstructed based on the first set of image data using a first reconstruction technique (or algorithm) and the second image may be reconstructed based on the second set of image data using a second reconstruction technique (or algorithm). Exemplary reconstruction techniques may include an iterative reconstruction technique, an analytic reconstruction technique, etc. Exemplary iterative reconstruction techniques may include a simultaneous algebraic reconstruction technique (SART), a simultaneous iterative reconstruction technique (SIRT), an ordered subset convex technique (OSC), a maximum-likelihood reconstruction with ordered subsets technique, an ordered subset expectation maximization (OSEM) technique, an Adaptive statistical iterative reconstruction (ASIR) technique, a least squares QR (LSQR)-based reconstruction technique, an expectation maximization technique, an ordered subsets-separable paraboloidal surrogates (SPS), an algebraic reconstruction technique (ART), a Kacsmarz reconstruction technique, or the like that meets an application requirement, etc. Exemplary analytic reconstruction techniques may include a Fourier slice theorem technique, a filtered back projection (FBP) technique, a fan-beam reconstruction technique, etc.

The first reconstruction technique and the second reconstruction technique may be the same or different. In some embodiments, the first image and the second image may be reconstructed based on the same reconstruction technique with different reconstruction parameters (e.g., counts of iterations using an iterative reconstruction technique). In some embodiments, the first image and the second image may be reconstructed using the same reconstruction technique with the same reconstruction parameters (e.g., counts of iterations using an iterative reconstruction algorithm).

In some embodiments, the first image and the second image may be reconstructed using the same or different iterative reconstruction techniques. Using an iterative reconstruction technique, the first image may be generated based on the first set of image data via a first iterative process including performing a first count of iterations. The first iterative process may be performed through an iterative reconstruction algorithm corresponding to the iterative reconstruction technique. In some embodiments, the second image may be generated based on the second set of image data via a second iterative process including performing a second count of iterations. Similarly, the second iterative process may be performed through an iterative reconstruction algorithm. In some embodiments, the first count of iterations may be the same or different from the second count of iterations. For example, the first count of iterations may exceed or equal the second count of iterations.

Using an iterative reconstruction algorithm may include, for each iteration, determining a preliminary image, determining assumed projection data corresponding to the preliminary image based on the preliminary image, determining a difference between the assumed projection data and actual projection data (e.g., the first set of image data, the second set of image data), and updating the preliminary image based upon the difference.

Merely by way of example, the first iterative process may be performed according to an objective function of an iterative reconstruction algorithm, as below:

$$\min_{X \geq 0} \|AX - Y\|_w^2 + \beta R(X), \quad (1)$$

where X represents a first preliminary image of the subject reconstructed in a current iteration of the first iterative process, Y represents the first set of image data of the subject obtained in 501, A represents a system matrix configured to transform X into the same data type (e.g., projection data) as that of Y, and W represents a weighting parameter of Y. The projection data Y (e.g., the first set of image data) used in each iteration of the first iterative process may have a corresponding weighting parameter W. R(X) represents a regularization function which may suppress an overall noise of the first preliminary image in the iterative process, and β represents a regularization coefficient for controlling the balance between a projection deviation and an image smoothness. In some embodiments, the value of β may be a constant, for example, a value within a value range. For example, the value of β may be a random value in the value range. By solving the objective function (1), the processing device 140 may determine the first preliminary image generated in an iteration corresponding to the minimum value of the objective function (1) as the first image.

For illustration purposes, a current iteration (e.g., a first iteration) of the first iterative process is described in the following description. In some embodiments, the processing device 140 may generate a first preliminary image based on the first set of image data. Merely by way of example, the processing device 140 may process the first set of image data through an air correction, a convolution, a back projection, or the like, and generate the first preliminary image based on the processed first set of image data using an image reconstruction algorithm (e.g., a Fourier transform algorithm). The first preliminary image may be inputted into the objective function (1) to perform the current iteration. In the current iteration, the value of the objective function (1) may reflect a difference between the projection data transformed from the first preliminary image and the first set of image data. R(X) and β may correct the first preliminary image in the current iteration. The first preliminary image may be updated through the current iteration. The updated first preliminary image may be designated as the first preliminary image in the next iteration. The processing device 140 may determine whether a termination condition is satisfied in the current iteration. Exemplary termination conditions may include that a certain count of iterations have been performed, that the value of the objective function (1) has reached certain accuracy, that the value of the objective function (1) has convergent, etc. Upon a determination that the termination condition is satisfied in the current iteration, the processing device 140 may designate the first preliminary image generated in the current iteration as the first image. Upon a determination that the termination condition is not satisfied in the current iteration, the processing device 140 may proceed to the next iteration.

In some embodiments, the iterative reconstruction algorithm(s) applied in the first iterative process and the second iterative process may be the same or different. For illustration, the second iterative process may be considered to apply the same iterative reconstruction algorithm as that of the first iterative process hereinafter. Merely by way of example, the second iterative process may be performed according to the objective function (1), for example, by replacing the first set of image data Y with the second set of image data obtained in 502, replacing the first preliminary image X with a second preliminary image of the subject reconstructed in a current iteration of the second iterative process, replacing A with a system matrix of the second set of image data, and replacing W with a weighting parameter of the second set of image data.

In some embodiments, the value(s) of a parameter of the objective function (1) may be different in the first and second iterative processes. For example, the value(s) of β may be set differently in the first and second iterative processes. The smaller the value of β is, the greater an image noise of an image reconstructed based on the objective function (1) may be. By determining the value of β in the second iterative process as a value smaller than that of the first iterative process, a noise level of the first image may be lower than a noise level of the second image. The second image may be generated in a similar manner as the generation of the first image as described in 503, and not repeated herein. The first image and the second image may have the same size, the same content (e.g., a posture and a structure of the subject), and different features (e.g., image quality, image attribute).

In some embodiments, the amount of information of image data may be related to its corresponding angle range. A smaller angle range may require a shorter time period for a scanning operation designed to generate an image of the subject than a larger angle range, which may improve the time resolution of the image and reduce image noises (e.g., a motion artifact caused by a physiological motion that the subject undergoes). Since the first angle range includes a smaller data acquisition angle than the second angle range, the first image may have a lower noise level than the second image. Merely by way of example, the first angle range including a small data acquisition angle may be applied in image reconstruction of the heart to obtain the first image (e.g., a heart image) with a high time resolution and with a low noise level than the second image (e.g., a heart image) corresponding to the second angle range. Since the heart may be considered to be static within a short time period corresponding to a small data acquisition angle, in some conditions, the heart image may have no noise. However, the small angle range may result in insufficient image data to be acquired by the scanner, and a noiseless image may be sub-optimal in the medical application.

The second angle range may require a longer time period than the first angle range for a scanning operation, which may allow the second set of image data to include global features and ensure sufficient image data to be acquired by the scanner. Since the second angle range may require a longer time period than the first angle range for a scanning operation, a time resolution corresponding to the second image may exceed a time resolution corresponding to the first image. In addition, the noise of the second image corresponding to the second angle range may have a uniform distribution and may not have obvious directivity. Since the smaller angle range may reduce the image noise level, the noise level of the first image may be lower than a noise level of the second image.

In 505, the processing device 140 (e.g., the target image generation module 404) may generate a target image based on the first image and the second image.

In some embodiments, the processing device 140 may generate a first intermediate image by performing image arithmetic between the first image and the second image. The processing device 140 may generate the target image based on the first intermediate image and at least one of the first image or the second image. For example, the processing device 140 may perform another image arithmetic between the first intermediate image and the first image to generate the target image.

As another example, the processing device 140 may generate a second intermediate image by processing the first intermediate image through a filtering operation, an image denoising operation, a blurring operation, or the like, or a combination thereof. The processing device 140 may further generate the target image based on the second intermediate image and at least one of the first image and the second image. More descriptions regarding the generation of the target image may be found elsewhere in the present disclosure. See, e.g., FIG. 6 and relevant descriptions thereof.

In some embodiments, the processing device 140 may generate the target image based on the first image and the second image using a trained machine learning model. For example, the processing device 140 may input the first image and the second image into the trained machine learning model and the trained machine learning model may output the target image. The trained machine learning model may be obtained by a processing device that is same or different from the processing device 140 via training a machine learning model using a plurality of training samples online or offline. In some embodiments, each of the plurality of training samples may include a pair of images each of which corresponds to an angle range. The angle ranges of the pair of images may be different. The pair of images and the angle ranges thereof may be the same as or similar to the first image and the second image. Each of the plurality of training samples may include a reference image that includes a higher time resolution than one of the pair of images which corresponds to a higher angle range and a lower noises level than the one of the pair of images which corresponds to a higher scan range. During the training process of the trained machine learning model, the pair of images may be served as an input and the reference image may be served as a desired output. The training process of the trained machine learning model may include a plurality of iterations. In each iteration, an estimated output of the machine learning model may be generated based on the pair of images. The estimated output may be compared with the desired output using a cost function. If a termination condition is not satisfied in a current iteration, parameter values of the machine learning model generated in a prior iteration may be adjusted and updated based on a value of the cost function to reduce a difference between an estimated output and a desired output. If the termination condition is satisfied in a current iteration, the machine learning model with updated parameter values generated in the prior iteration may be designated as the trained machine learning model.

By generating the target image based on the first image and the second image, the target image may have a higher time resolution than the second image and a less noise level than the second image. In addition, the target image may include uniform and non-directional noises, and the target image may be reconstructed based on sufficient image data.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. Additionally, the order in which the operations of the process 500 described above is not intended to be limiting. For example, the process 500 may include an additional operation in which the processing device 140 transmits the target image to a terminal device for display. As another example, operations 503 and 504 may be omitted. The first set of image data and the second set of image data may include the first image and the second image. In some embodiments, the operations 503 and 504 may be omitted. The first set of image data and the second set of image data may include the first projection data and the second projection data, and the processing device 140 may generate the target image based on the first projection data and the second projection data. For example, the processing device 140 may generate target projection data based on the first projection data and the second projection data and reconstruct the target image based on the target projection data. As a further example, the processing device 140 may generate the target projection data using a trained machine learning model. As still another further example, the processing device 140 may generate the target projection data as similar to the generation of the target image as described in FIG. 6.

FIG. 6 is a flowchart illustrating an exemplary process 600 for generating a target image according to some embodiments of the present disclosure. In some embodiments, process 600 may be executed by the imaging system 100. For example, the process 600 may be implemented as a set of instructions (e.g., an application) stored in a storage device (e.g., the storage device 150, the storage 220, and/or the storage 390). In some embodiments, the processing device 140 (e.g., the processor 210 of the computing device 200, the CPU 340 of the mobile device 300, and/or one or more modules illustrated in FIG. 4A) may execute the set of instructions and may accordingly be directed to perform the process 600. In some embodiments, one or more operations of the process 600 may be performed to achieve at least part of operation 505 as described in connection with FIG. 5.

In 601, the processing device 140 (e.g., the target image generation module 404) may generate a first intermediate image by performing an image arithmetic between a first image and a second image. The first image and the second image may be obtained as described in connection FIG. 5.

As used herein, performing an image arithmetic between the first image and the second image refer to performing an image arithmetic between corresponding pixel values in the first image and the second image. The corresponding pixel values in the first image and the second image may refer to values of a pixel in the first image and a pixel in the second image that are located at the same physical position in the first image and the second image or represent the same portion of a subject represented in the first image and the second image.

The image arithmetic may include at least one of an addition operation, an image subtraction operation, a multiplication operation, or a division operation. In some embodiments, the processing device 140 may generate the first intermediate image through the image subtraction operation, that is, determining a difference between the first image and the second image. Taking a physical portion of the subject as an example, a pixel value (a grey value) representing the physical portion in the first intermediate image may be equal to a difference between a pixel value representing the physical portion in the first image and a pixel value representing the physical portion in the second image. Since the first image has a lower noise level than the second image and the second image has non-directional noises, the first intermediate image may include a lot of information relating to the noises that are similar to or the same as the first image.

In 602, the processing device 140 (e.g., the target image generation module 404) may generate the target image based on the first intermediate image and at least one of the first image or the second image.

In some embodiments, the processing device 140 may generate the target image by performing an image arithmetic between the first image and the first intermediate image.

In some embodiments, the processing device 140 may generate the target image by generating a second intermediate image based on the first intermediate image. The processing device 140 may generate the target image based on the second intermediate image and the at last one of the first image or the second image. For example, the processing device 140 may generate the target image by performing an image arithmetic between the first image and the second intermediate image.

In some embodiments, the processing device 140 may generate a second intermediate image based on a noise distribution adjustment operation and the first intermediate image. In some embodiments, the noise distribution adjustment operation may be performed directly on the first intermediate image, or on an image generated by processing the first intermediate (e.g., a third intermediate image), so as to reduce or eliminate the noises caused by an anatomical structure of the subject and the physiological motion the subject undergoes, for example, an artifact.

In some embodiments, the processing device may generate the second intermediate image by obtaining a weighting parameter corresponding to the first intermediate image. The processing device 140 may generate the second intermediate image based on the weighting parameter and the first intermediate image. The weighting parameter may be used to perform the noise distribution adjustment operation. For example, the processing device 140 may perform the noise distribution adjustment operation on the first intermediate image to generate the second intermediate image by multiplying the weighting parameter and the first intermediate image. As another example, the processing device 140 may perform the noise distribution adjustment operation on an image (e.g., a third intermediate image, a fifth intermediate image, etc.) generated by processing the first intermediate image to generate the second intermediate image by multiplying the weighting parameter and the image (e.g., a third intermediate image, a fifth intermediate image, etc.) generated by processing the first intermediate image. The weighting parameter may include a weight matrix, a weight array, or the like, which has the same size as the first intermediate image or the image generated by processing the first intermediate image. The weighting parameter may include a plurality of elements each of which corresponds to a pixel of the first intermediate image. An element corresponding to a pixel of the first intermediate image may represent a weight for adjusting a pixel value of the pixel in the first intermediate image or the image generated by processing the first intermediate image. For example, for a physical portion of the subject, a pixel value representing the physical portion in the second intermediate image may be equal to a product of a pixel value representing the physical portion in the first intermediate image and its corresponding element of the weighting parameter. In some embodiments, the element of the weighting parameter may be a value within a range 0 to 1. In some embodiments, the second intermediate image may have more uniform noise distribution than the first intermediate image. For example, the elements corresponding to different regions of the first intermediate image may have different values, which makes the noises in the second intermediate image more uniform. In some embodiments, the element of the weighting parameter may be a decimal (for example, a value within a range of 0.4 to 0.6), which may fully reduce overall noises in the second intermediate image, thereby avoiding excessive noise information in the first intermediate image from being introduced into the target image. Additionally or alternatively, the processing device 140 may determine the weighting parameter based on the first image and the second image. For example, the processing device 140 may determine a difference image between the first image and the second image, reconstruct a mask image, and generate a noise model based on the difference image and the mask image. The processing device 140 may determine the weighting parameter based on the noise model and a target noise level (e.g., a desired noise level of the target image).

In some embodiments, since the noise caused by the anatomical structure of the subject and the physiological motion the subject undergoes may be mainly in a low-frequency part of the first intermediate image, a high-pass filtering operation may be used to reduce or eliminate such noises. For example, the processing device 140 may generate the second intermediate image by generating a third intermediate image via processing the first intermediate image using a high-pass filter and performing the noise distribution adjustment operation on the third intermediate image. The high pass filter used may include an ideal high pass filter (IHPF), a Butterworth high pass filter (BHPF), a Gaussian high pass filter (GHPF), or the like, or any combination thereof. The third intermediate image may be the same size as the second intermediate image. The processing device 140 may generate the second intermediate image by performing the noise distribution adjustment operation on the third intermediate image, for example, in a similar or same manner as the noise distribution adjustment operation performed on the first intermediate image. The noises of the third intermediate image may affect the image quality of the target image. For example, noises of the third intermediate image may be introduced into the second intermediate image and then affect the image quality of the target image determined based on the second intermediate image and the second image. Thus, a suitable weighting parameter of the third intermediate image may be required to perform the noise distribution adjustment operation on the third intermediate image, so as to generate the second intermediate image with more uniform noise distribution.

In some embodiments, the processing device 140 may generate the second intermediate image by generating a fourth intermediate image based on the first intermediate image, generating a fifth intermediate image based on the first intermediate image and the fifth intermediate image, and performing the noise distribution adjustment operation on the fifth intermediate image. The blurring operation (also referred to as smoothing operation) may average out a rapid change in pixel intensity (i.e., pixel values) of an image.

In some embodiments, the processing device 140 may generate the fourth intermediate image by performing a blurring operation on the first intermediate image. In some embodiments, the blurring operation may include a total variation (TV) denoising operation. The processing device 140 may generate the fourth intermediate image by smoothing and denoising the first intermediate image through the total TV denoising operation. Merely by way of example, through the total TV denoising operation, the processing device 140 may perform a significant smoothing and denoising on a region in the first intermediate image that includes an image gradient less than a threshold, and perform a weakened smoothing and denoising on a region in the first intermediate image that includes an image gradient greater than the threshold. In the first intermediate image, the region with the image gradient less than the threshold may include a region with a smaller difference value between adjacent pixels, and the region with the image gradient greater than the threshold may include a larger difference value between adjacent pixels, such as a contour of the first intermediate image. Through the total TV denoising operation, the fourth intermediate image may have reduced noises than the first intermediate image while maintaining the contour of the first intermediate image. The noise level of the fourth intermediate image may be less than the noise level of the first intermediate image.

In some embodiments, the processing device 140 may generate a fifth intermediate image by performing an image arithmetic between the first intermediate image and the fourth intermediate image. For example, the fifth intermediate image may be generated through an image subtraction, that is, determining a difference between the fourth intermediate image and the first intermediate image. In such case, the fifth intermediate image may only include noises. The processing device 140 may generate the second intermediate image by performing the noise distribution adjustment operation on the fifth intermediate image, for example, in a similar manner as the noise distribution adjustment on the first intermediate image.

In some embodiments, the processing device 140 may generate the target image by performing an image arithmetic between the first image and the second intermediate image. For example, the target image may be generated by adding the first image to the second intermediate image. Since the first image has a high time resolution and a low noise level, and the second intermediate image is generated through a filtering operation, an image denoising operation, and/or a blurring operation and maintains a portion of image data of the subject, the target image may have a high time resolution, a high definition, and a low noise level, which improves the accuracy of a medical diagnosis based on the target image.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted.

Figure 7:
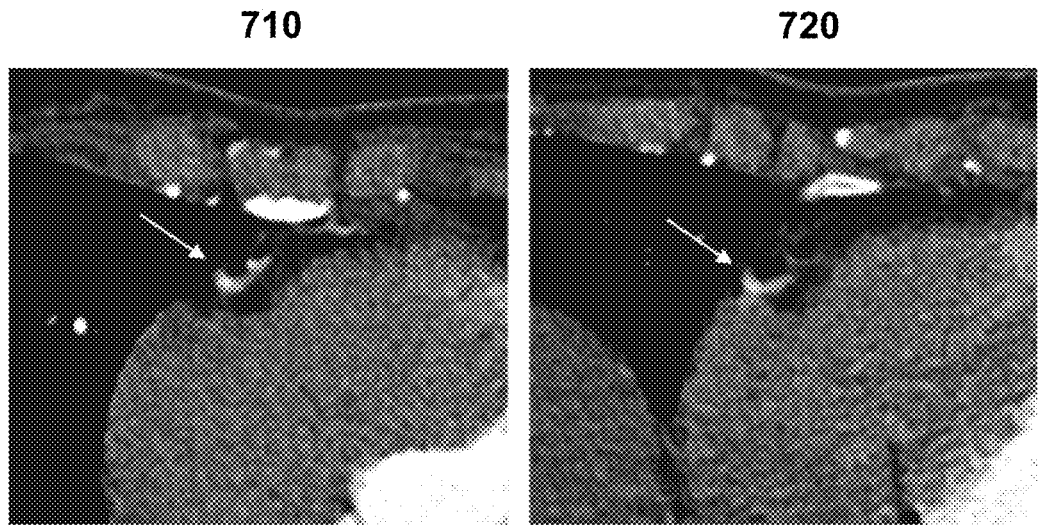
FIG. 7 shows exemplary cross-section cardiovascular images that is generated according to a conventional image reconstruction algorithm.
Figure 8:
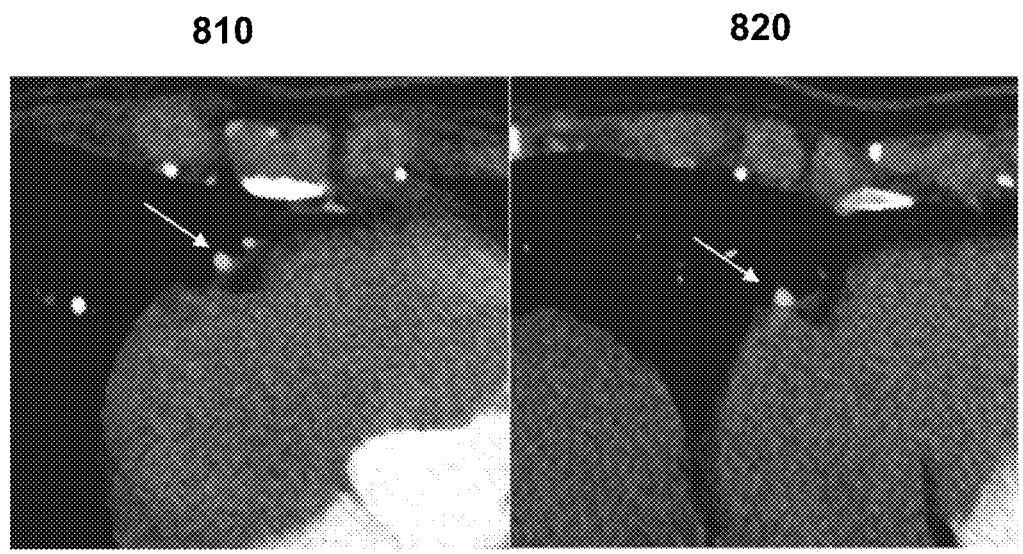
FIG. 8 shows exemplary cardiovascular cross-section images that is generated according to some embodiments of the present disclosure.
Figure 9:
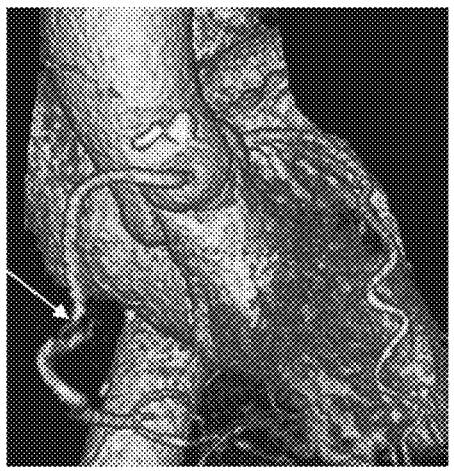
FIG. 9 shows an exemplary virtual reality (VR) cardiovascular image that is generated according to a conventional image reconstruction algorithm.
Figure 10:
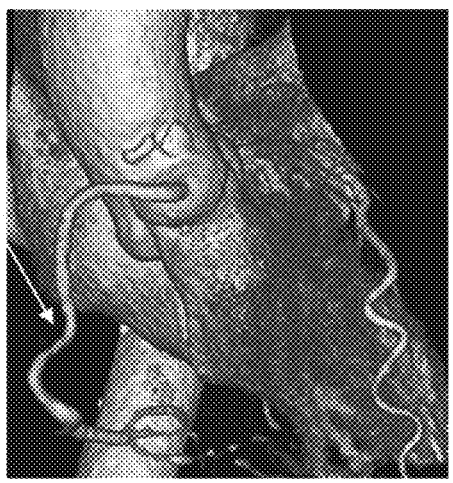
FIG. 10 shows an exemplary VR cardiovascular image that is generated according to some embodiments of the present disclosure.

FIG. 7 shows exemplary cross-section cardiovascular images 710 and 720 that is generated according to a conventional image reconstruction algorithm. FIG. 8 shows exemplary cross-section cardiovascular images 810 and 820 that is generated according to some embodiments of the present disclosure. FIG. 9 shows an exemplary VR cardiovascular image 900 that is generated according to a conventional image reconstruction algorithm. FIG. 10 shows an exemplary VR cardiovascular image 1000 that is generated according to some embodiments of the present disclosure. By comparing the two white arrows in 710 and 810, the two white arrows in 720 and 820, and the two white arrows in 900 and 1000, respectively, the cardiovascular images (810, 820, 1000) that are generated according to some embodiments of the present disclosure (e.g., process 500) have a higher time resolution and fewer motion artifacts caused by the vasomotion that the coronary artery undergoes.

It should be noted that the examples in FIGS. 7-10 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 11 is a flowchart illustrating an exemplary process for generating a target image according to some embodiments of the present disclosure. In some embodiments, process 1100 may be executed by the imaging system 100. For example, the process 1100 may be implemented as a set of instructions (e.g., an application) stored in a storage device (e.g., the storage device 150, the storage 220, and/or the storage 390). In some embodiments, the processing device 140 (e.g., the processor 210 of the computing device 200, the CPU 340 of the mobile device 300, and/or one or more modules illustrated in FIG. 4A) may execute the set of instructions and may accordingly be directed to perform the process 1100.

In 1101, the processing device 140 (e.g., the obtaining module 401) may obtain a first set of image data of a subject acquired by a scanner (e.g., the imaging device 110). The first set of image data may correspond to a first angle range of the scanner.

In 1102, the processing device 140 (e.g., the obtaining module 401) may obtain a second set of image data of the subject acquired by the scanner. The second set of image data may correspond to a second angle range of the scanner that is different from the first angel range.

In 1103, the processing device 140 (e.g., the target image generation module 404) may generate a target image based on the first set of image data and the second set of image data.

In some embodiments, the first set of image data and the second set of image data may include projection data acquired by the scanner via scanning the subject. The first set of image data may also be referred to as a first set of projection data. The second set of image data may also be referred to as a second set of projection data. More descriptions of the first angle range, the second angle range, the first set of image data and/or the second set of image data may be found in operations 501 and 502 as illustrated in FIG. 5. The processing device 140 may generate the target image based on the first set of projection data and the second set of projection data. In some embodiments, the processing device 140 may reconstruct the target image using the first set of projection data and the second set of projection data based on a reconstruction technique as described elsewhere in the present disclosure (e.g., FIG. 5, and the descriptions thereof). For example, the processing device 140 may reconstruct the target image using an iterative reconstruction technique. Using the iterative reconstruction technique, the processing device 140 may perform a plurality of iterations. The plurality of iterations may include a first portion and a second portion. In each iteration in the first portion, the first set of projection data may be used to reconstruct the target image and in each iteration in the second portion, the second set of projection data may be used to reconstruct the target image. In some embodiments, the count of iterations in the first portion may exceed or equal to the count of iterations in the second portion.

For example, the first set of projection data may be used to reconstruct the target image in the first portion of the plurality of iterations and the second set of projection data may be used to reconstruct the target image in the second portion of the plurality of iterations according to objective function (1) as described in FIG. 5. For illustration purposes, a current iteration in the first portion of the plurality of iterations may be described in the following description. In some embodiments, the processing device 140 may generate a preliminary image based on the first set of projection data. The preliminary image may be inputted into the objective function (1) to perform the current iteration in the first portion. In the current iteration in the first portion, the value of the objective function (1) may reflect a difference between the projection data transformed from the preliminary image and the first set of projection data. The preliminary image may be updated through the current iteration in the first portion. The updated preliminary image may be designated as the preliminary image in a next iteration. After the first portion of the plurality of iterations are performed, the processing device 140 may perform the second portion of the plurality of iterations. The preliminary image generated in the last iteration in the first portion may be inputted into the objective function (1) to perform a current iteration in the second portion. In the current iteration in the second portion, the value of the objective function (1) may reflect a difference between the projection data transformed from the preliminary image and the second set of projection data. The preliminary image may be updated through the current iteration in the second portion according to the difference between the projection data transformed from the preliminary image and the second set of projection data. The updated preliminary image may be designated as the preliminary image in a next iteration in the second portion. In some embodiments, the processing device 140 may obtain more sets of projection under different angle ranges except the first set of projection data and the second set of projection for reconstructing the target image.

The processing device 140 may determine whether a termination condition is satisfied in the current iteration. Exemplary termination conditions may include that a certain count of iterations have been performed. Upon a determination that the termination condition is satisfied in the current iteration in the second portion, the processing device 140 may designate the preliminary image generated in the current iteration as the target image.

In some embodiments, the first set of image data and the second set of image data may include images (e.g., the first image and the second image as described in FIG. 5) reconstructed based on projection data. The first set of image data may also be referred to as a first image. The second set of image data may also be referred to as a second image. More descriptions of the first image and the second image may be found in operations 503 and 504 as illustrated in FIG. 5. The processing device 140 may generate the target image based on the first image and the second image. More descriptions for generating the target image based on the first image and the second image may be found elsewhere in the present disclosure (e.g., FIGS. 5 and 6, and the descriptions thereof). For example, the processing device 140 may generate the target image using a trained machine learning model based on the first image and the second image.

It should be noted that the above description regarding the process 1100 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. Additionally, the order in which the operations of the process 1100 described above is not intended to be limiting.

FIG. 12 is a flowchart illustrating an exemplary process for image reconstruction according to some embodiments of the present application. In some embodiments, process 1200 may be executed by the imaging system 100. For example, the process 1200 may be implemented as a set of instructions (e.g., an application) stored in a storage device (e.g., the storage device 150, the storage 220, and/or the storage 390). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 1200. In some embodiments, operations 503 and/or 504 may be performed according to process 1200 as illustrated in FIG. 12.

In 1201, a set of image data of a subject acquired by a detector of a scanner may be obtained. Operation 1201 may be performed by the obtaining module 405 or the obtaining module 401. The set of image data may correspond to an angle range of the scanner.

In some embodiments, the set of image data may include projection data acquired by the multiple rows of the detection units of the detector when the scanner rotates in the angle range for one or more times (also referred to as data acquisition angles as described in FIG. 5).

In some embodiments, the processing device 140 may determine a center angle of the angel range and the subject may be in a target phase of the physiological motion of the subject (e.g., when the cardiac motion is gentle) at the data acquisition moment corresponding to the center angle, and then determine the angle range corresponding to a data acquisition time period based on the rotation speed of the scanner, the center angle, and the data acquisition moment corresponding to the center angle.

The angle range (i.e., the data acquisition angle or the width of the angle range) may be smaller or equal to a threshold, for example, 120 degrees, 150 degrees, 180 degrees, 240 degrees, etc. A smaller angle range may correspond to a shorter data acquisition time period such that the motion time of the subject is short, which is beneficial to reduce motion artifacts in reconstruction. The angle range may include multiple data acquisition angles. As used herein, a data acquisition angle may refer to a sub-range in the angle range of the scanner. For example, when the angle range is from 0 to 180 degrees, the center angle may be 90 degrees and the multiple data acquisition angles may include angles from 0 to 10 degrees, from 10 to 20 degrees, ..., from 80 degrees to 90 degrees, etc., or from 0 to 5 degrees, from 5 to 10 degrees, ..., etc., or from 0 to 1 degrees, from 1 to 2 degrees, from 2 to 3 degrees, ..., etc. When the scanner rotates 90 degrees, the subject may be in a target phase of the physiological motion. In some embodiments, the data acquisition angle may be denoted by an angle in the sub-range. For example, if the multiple data acquisition angles may include angles from 0 to 10 degrees, from 10 to 20 degrees, ..., from 80 degrees to 90 degrees, etc., the data acquisition angles may be denoted as 10 degrees, 20 degrees, ..., 90 degrees, etc., respectively.

In some embodiments, the set of image data may include status information such as the serial numbers of the multiple rows of detection units that collect the set of image data, the voltage value of the radiation source 115, the bed code position of the scanning table 114, time stamps, etc. The serial number corresponding to a row of detection units may be used to indicate the position of the row of detection units in the detector (e.g., the detector 112 as described in FIG. 15). For example, the serial number corresponding to a row of detection units may be the value of a cone angle corresponding to the row of detection units, or the z-axis coordinate value of the row of detection units, or the arrangement position of the row of detection units in the multiple rows of the detection units, etc. In some embodiments, the positions of the one or more rows of detection units may be represented by the cone angle corresponding to the one or more rows of detection units. For example, if there is only one row of detection units, the cone angle corresponding to the row of detection units may be used to indicate the position of the row of detection units. If there are multiple rows of detection units, the average of the cone angles corresponding to the multiple rows of detection units may be used to indicate the positions of the multiple rows of detection units. In some embodiments, the position of the one or more rows of detection units may be represented by the z-axis coordinate values of the one or more rows of detection units. For example, in the case of a single row of detection units, the value of the z-axis coordinate of the row of detection units may indicate the position of the row of detection units. In the case of multiple rows of detection units, the average value of multiple z-axis coordinates can indicate the positions of multiple rows of detection units. In some embodiments, the position of the one or more rows of detection units may be represented by a specific row number of the physical arrangement of the one or more rows of detection units in the detector. For example, the Nth row under the arrangement direction of the detector may be designated as the position of the one or more rows of detection units in the detector.

In some embodiments, detection units in the same row may correspond to the same serial number. For example, if the serial number includes the z-axis coordinate value of a row of detection units, the detection units in the same row may correspond to the same z-axis coordinate value. A cone angle corresponding to a row of detection units may refer to an angle between a line between a center point of the detector and a radiation source (e.g., the radiation source 115) and a plane where the transmit paths of radiation rays from the radiation source to the row of detection units is located. In some embodiments, detection units in the same row may include the same cone angle. Detection units in the same row arranged in the boundary area of the detector may have larger cone angles than detection units in the same row arranged in a center area of the detector.

The set of image data may include multiple groups each of which is acquired by at least a portion of multiple detection units in the detector. The multiple detection units in the detector may arranged along the Z axis of the scanner in the multiple rows. In some embodiments, the portion of the detection units that acquire one group of the set of image data may have the same serial number or position (e.g., have the same cone angle), e.g., in the same row. In some embodiments, the portion of the detection units that acquire one group of the set of image data may have cone angles that are in a range. In some embodiments, each group of the multiple groups of the set of image data may correspond to one or more data acquisition angles in the angle range, i.e., the one group of the set of image data may be acquired by the at least a portion of the multiple detection units when the scanner rotates the one or more data acquisition angles. More descriptions for the detector may be found elsewhere in the present disclosure (e.g., FIG. 1 and FIG. 15, and the descriptions thereof).

In some embodiments, the set of image data may include the first set of image data and/or the second set of image data as described in FIG. 5. More descriptions for the set of image data may be found elsewhere in the present disclosure.

In some embodiments, the processing device 140 may obtain the set of image data from at least one component of the system 100 (e.g., the imaging device 110, the terminal(s) 130, the storage device 150, etc.). For example, the processing device 140 may directly acquire the set of image data from the imaging device 110. Alternatively or additionally, the processing device 140 may obtain the set of image data from a storage device via the network 120. For example, the processing device 140 may obtain the set of image data from a medical database.

In 1202, a weighting parameter corresponding to the angel range may be determined based on the positions of the detection units in the detector. Operation 220 may be performed by the determining module 406.

It should be understandable that, the projection data may include most useful information when the projection data is acquired at the data acquisition moment corresponding to the center angle in the angle range of the scanner rotating when the subject is in a target phase of the physiological motion (e.g., when the cardiac motion is gentle). The farther a data acquisition angle in the angle range is from the center angle, the less useful information contained in the acquired projection data may be. In other words, the farther a data acquisition moment corresponding to a data acquisition angle in the angle range of the scanner from the data acquisition moment corresponding to the center angel is, the less useful information contained in the projection data acquired at the data acquisition moment corresponding to the data acquisition angle may be. Therefore, the projection data acquired at each data acquisition angle in the angel range contributes differently to the reconstructed image during reconstruction. The degree of contribution of the projection data acquired at a data acquisition angle to image reconstruction may be represented by a weighted value. The larger the weighted value is, the higher the degree of contribution may be; and the smaller the weighted value, the smaller the degree of contribution may be. In addition, projection data acquired by detection units having a larger cone angle may be not sufficient. For example, projection data acquired by a detection unit having a larger cone angle may contain less useful information than projection data acquired by a detection unit having a smaller cone angle under the same data acquisition angle (e.g., the center angle), and an iterative reconstruction used in image reconstruction may magnify the problem of insufficient data. Therefore, in order to ensure the quality of the reconstructed image, it is necessary to adjust the weighted values corresponding to projection data collected by detection units with larger cone angle. Therefore, the weighting parameters corresponding to an angle range may be related to differences between the multiple acquisition angles and the center angle of the angle range (i.e., center acquisition angle) and positions of the detection units.

In some embodiments, the weighting parameter may be denoted as a matrix that including a plurality of elements. Each of the plurality of elements may also be referred to as a target weighted value. Each of the plurality of elements may correspond to one group of the multiple groups of the set of image data. In some embodiments, the weighting parameter corresponding to the angle range may include at least one of a first item or a second item.

The first item may include a first weighting coefficient associated with a noise statistical model. In some embodiments, the first item may also be referred to as a preliminary weighting parameter. The second item may include a second weighting coefficient that is associated with the angle range and/or positions of detection units in the detector. In some embodiments, the second item may also be referred to as a correction factor of the preliminary weighting parameter.

In some embodiments, the weighting parameter corresponding to the angle range may include the second item. In some embodiments, the weighting parameter may be a multiplication (e.g., Hadamard product) between the first item and the second item. For example, the weighting parameter may be denoted by Equation (2) as following:

$$w = w\_s * w\_cone, \qquad (2)$$

where $w\_s$ represents the first item (i.e., a preliminary weighting parameter) that may be determined according to the signal-to-noise ratio of the set of image data (e.g., projection data), and may be a default setting of the system 100, and $w\_cone$ denotes the second item (i.e., the correction factor) that is related to the data acquisition angles in the angle range of the scanner rotating when the scanner acquires the set of image data and/or the positions of the detection units acquiring the set of image data.

The second item may be determined based on the positions of the detection units in the detector and/or the differences between the data acquisition angles and the center angle in the angel range of the scanner. It can be understood that by adjusting the preliminary weighting parameters (i.e., the first item) based on the correction factor (i.e., the second item), the influence of the data acquisition angles and/or the positions of the detector may be introduced into the weighting parameter w.

In some embodiments, the second item may be denoted as a matrix that includes multiple correction values (also referred to as weighted values). Each of the multiple correction values may correspond to one group of the multiple groups of image data acquired by one or more detection units at a data acquisition angle in the angle range. A correction value corresponding to one group of the multiple groups of image data acquired by one or more detection units may be determined based on positions of the detection units and/or the data acquisition angle in the angle range. For example, a correction value corresponding to one group of the multiple groups of image data acquired by one or more detection units at a data acquisition angle may be negatively related to the difference between the data acquisition angle and the center angle. In other words, the larger the difference between the data acquisition angle and the center angle, the smaller the correction value corresponding to one group of the multiple groups of image data acquired by one or more detection units at a data acquisition angle may be. As another example, the positions of the one or more detection units may be denoted by a cone angle of the detection units, and a correction value corresponding to one group of the multiple groups of image data acquired by the one or more detection units at the data acquisition angle may be positively related to the cone angle. In other words, the larger the cone angle of the one or more detection units is, the larger the correction value corresponding to one group of the multiple groups of image data acquired by one or more detection units at a data acquisition angle may be.

In some embodiments, the processing device 140 may determine a first correction value corresponding to one group of the multiple groups of image data acquired by one or more detection units at a data acquisition angle based on the difference between the data acquisition angle and the center angle. The processing device 140 may determine a second correction value corresponding to the one group of the multiple groups of image data acquired by the one or more detection units at the data acquisition angle based on the cone angle of the one or more rows of detection units. The processing device 140 may determine a correction value in the second item corresponding to the one group of the multiple groups of image data by multiplying the first correction value and the second correction value.

In some embodiments, the processing device 140 may designate first correction values corresponding to the multiple groups of image data acquired by one or more detection units at multiple data acquisition angles in the angle range of the scanner as the correction values in the second item.

In some embodiments, the processing device 140 may designate second correction values corresponding to the multiple groups of image data acquired by one or more detection units determined based on positions of the detection units as the correction values in the second item. More descriptions for determining the second correction values may be found in FIG. 13.

The weighing parameter determined based on the first item and the second item may be related to the second item. In other words, a weight value in the weighing parameter corresponding to one group of image data acquired by one or more detection units at a data acquisition angle may be negatively related to the difference between the data acquisition angle and the center angle and positively related to the cone angle.

Accordingly, the weighting parameters corresponding to the set of image data acquired by the detection units corresponding to different cone angles under different data acquisition angles in the angle range may be different. More descriptions for determining the weighting parameters may be found elsewhere in the present disclosure, for example, FIG. 13-FIG. 14, which will not be repeated here.

In 1203, an image may be generated based on the weighting parameter corresponding to the angle range and the set of image data. Operation 1203 may be performed by the image generation module 407.

In some embodiments, after determining the weighting parameter corresponding to data acquisition angles in the angle range, the processing device 140 may reconstruct the image based on the set of image data and the weighting parameter.

For example, the processing device 140 may weighting the set of image data using the weighting parameter to obtain weighted image data and reconstruct the image based on the weighted image data using an image reconstruction technique as described elsewhere in the present disclosure (e.g., FIG. 5 and the descriptions thereof).

As a further example, the processing device 140 may determine an objective function based on the weighting parameter. The objective function may be the same as or similar to the objective function (1) in FIG. 5. For example, the weighting parameter Y in the objective function (1) may be determined as the weighting parameter determined in operation 1202.

Using the objective function, the processing device 140 may obtain a preliminary value image based on the set of image data through analysis and processing. The processing device 140 may process the set of image data or the weighted image data through an air correction, a convolution, a back projection, or the like, and generate the preliminary image based on the processed image data using an image reconstruction algorithm (e.g., a Fourier transform algorithm). The preliminary image may be inputted into the objective function to perform the current iteration. In the current iteration, the value of the objective function may reflect a difference between projection data transformed from the preliminary image and the set of image data or the weight image data. R(X) and β may correct the preliminary image in the current iteration. The preliminary image may be updated through the current iteration. The updated preliminary image may be designated as the preliminary image in the next iteration. When a termination condition is satisfied in the current iteration, the preliminary image generated in the prior iteration may be designated as the image.

It should be noted that the above description regarding the process 1200 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. Additionally, the order in which the operations of the process 1200 described above is not intended to be limiting. For example, the process 1200 may include an additional operation in which the processing device 140 transmits the image to a terminal device for display. As another example, operations 1202 and 1203 may be integrated into one single operation.

Figure 13:
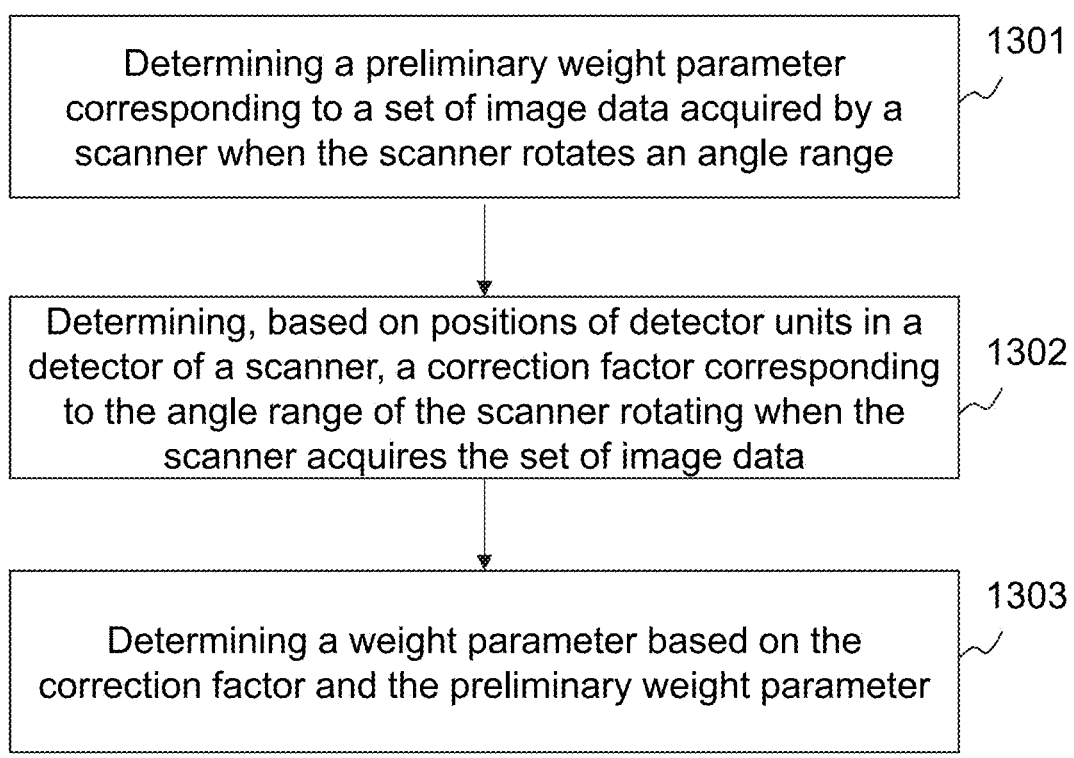
FIG. 13 is a flowchart illustrating an exemplary process for determining weighting parameters according to some embodiments of the present application.

FIG. 13 is a flowchart illustrating an exemplary process for determining a weighting parameter according to some embodiments of the present application. In some embodiments, process 1300 may be executed by the imaging system 100. For example, the process 1300 may be implemented as a set of instructions (e.g., an application) stored in a storage device (e.g., the storage device 150, the storage 220, and/or the storage 390). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 1200. In some embodiments, operation 1202 may be performed according to process 1300 as illustrated in FIG. 13.

In 1301, the processing device 140 may obtain a preliminary weighting parameter (also referred to as the first item as described in FIG. 12) corresponding to a set of image data acquired by a scanner when the scanner rotates an angle range. Operation 1301 may be performed by the obtaining module 404 or the weighting parameter determination module 405. The set of image data may be acquired by one or more detection units in the detector when the scanner rotates the angle range. In some embodiments, the set of image data may include multiple groups each of which may be acquired by detection units in the same row.

The preliminary weighting parameter may be denoted as a first matrix that includes multiple first weighted values. Each of the first weighted values may correspond to a portion of the set of image data that is acquired by detection units in one or more rows. The first weighted values may be related to noise-signal ratios in the set of image data. For example, the processing device 140 may determine the noise estimation corresponding to each group of the multiple groups of image data, and the preliminary weighting parameter may be determined according to the noise estimation. The greater the noise estimation corresponding to one group of the multiple groups of image data is, the smaller the first weighted value corresponding to the noise estimation may be. As another example, the processing device 140 may determine the quantum noise estimation in the state of the scan parameters for acquiring the set of image data and determine the preliminary weighting parameter based on the quantum noise estimation. In some embodiments, the quantum noise estimation may be determined based on a noise statistical model that is related to scanning parameters of the scanner, such as the radiation intensity, the tube voltage, the tube current, etc. In some embodiments, the noise statistical model may be determined according to a default setting of the system 100. The processing device 140 may obtain the noise statistical model from the storage device (e.g., the storage device 150).

In 1302, the processing device 140 may determine, based on positions of detection units in a detector of a scanner, a correction factor (also referred to as the first item as described in FIG. 12) corresponding to the angle range of the scanner rotating when the scanner acquires the set of image data.

In some embodiments, the correction factor may be denoted as a second matrix that include multiple second weighted values (also referred to as correction values). In some embodiments, the size of the first matrix may be the same as the second matrix. Each of the second weighted values may correspond to a portion of the set of image data that is acquired by detection units in the one or more same rows.

In some embodiments, a second weighted value in the correction factor corresponding to a portion of the set of image data that is acquired by detection units in one or more rows may be positively correlated with the cone angle corresponding to the one or more rows of detection units. In other words, the larger the cone angle corresponding to the one or more rows of detection units is, the larger the second weighted value may be. The smaller the cone angle corresponding to the one or more rows of detection units is, the smaller the second weighted value may be. In some embodiments, the cone angle corresponding to the one or more rows of detection units may be an average of cone angles of the one or more rows of detection units.

As described in FIG. 12, projection data acquired by one or more rows of detection units corresponding to a larger cone angle may be insufficient. The larger the cone angle, the more serious the problem of insufficient data may be. Therefore, during image reconstruction, weighted values of projection data acquired by one or more rows of detection units corresponding to a larger cone angle may be increased according to the acquisition conditions of the projection data (e.g., the positions of one or more rows of detection units) to offset the lack of projection data relative to weighted values of projection data acquired by one or more rows of detection units corresponding to a smaller cone angle.

In some embodiments, the correction factor may be determined according to the following Equation (3):

$$w\_cone = A(\theta_t) = \frac{1}{h(\cos\theta_t)^m}, \quad (3)$$

where w_cone denotes a second weighted value in the correction factor that corresponds to image data acquired by detection units in one or more rows, $\theta_t$ denotes the cone angle corresponding to the one or more rows of detection units, and h and m denote adjustment parameters that are values greater than 1. According to Equation (3), the larger the cone angle is, the larger the second weighted value may be; and the smaller the cone angle is, the smaller the second weighted value may be.

In 1303, the processing device 140 may determine a weighting parameter corresponding to the image data based on the corrector factor and the preliminary weighting parameter.

In some embodiments, the processing device 140 may determine a product between the preliminary parameter (i.e., the first matrix) and the correction factor (i.e., the second matrix) and designate the product as the weighting parameter.

It should be noted that the above description regarding the process 1300 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. Additionally, the order in which the operations of the process 1300 described above is not intended to be limiting. For example, the process 1300 may include an additional operation in which the processing device 140 may store the weighting parameter to a storage device. As another example, operations 1301 and 1303 may be integrated into one single operation.

Figure 14:
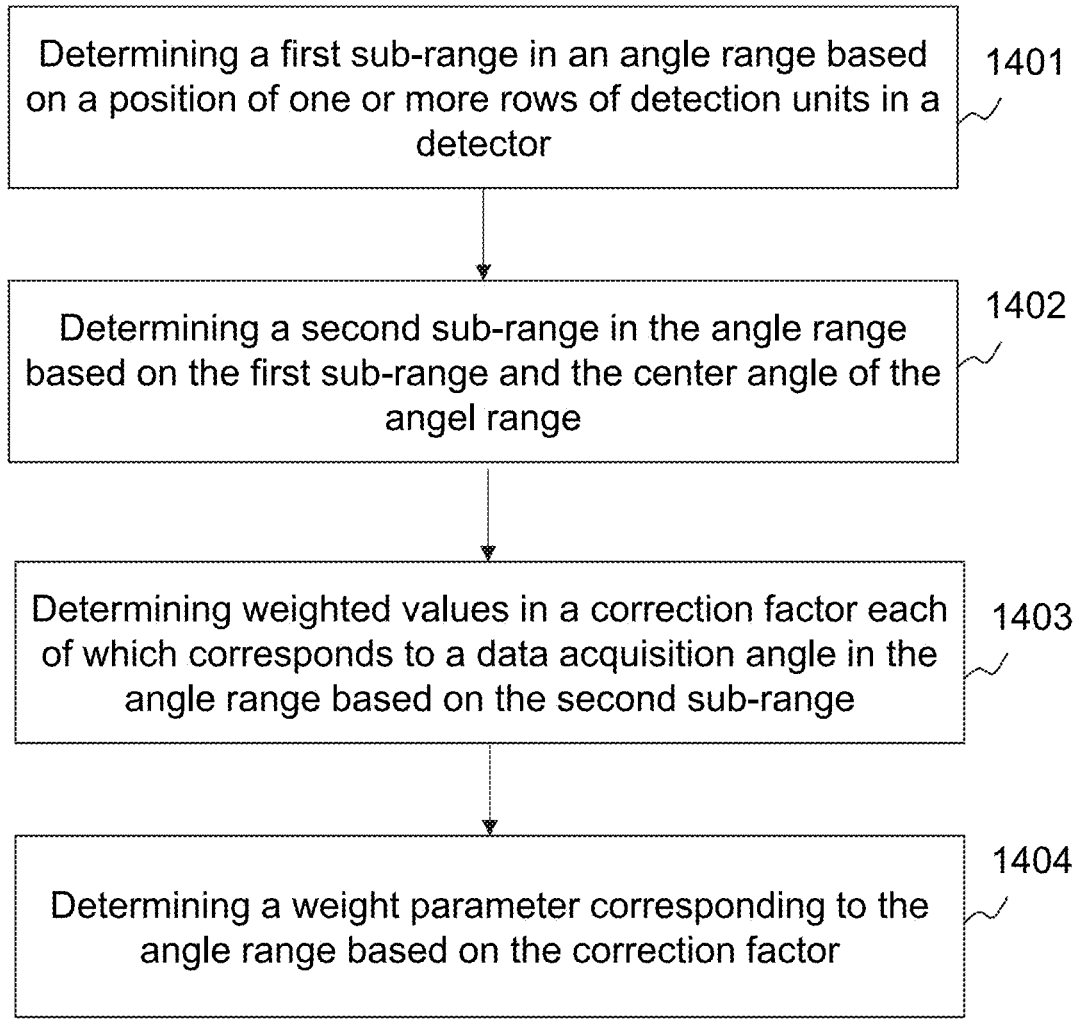
FIG. 14 is a flowchart illustrating an exemplary process for determining weighting parameters according to some embodiments of the present application.

FIG. 14 is a flowchart illustrating another process for determining a weighting parameter according to some embodiments of the present application. In some embodiments, process 1400 may be executed by the imaging system 100. For example, the process 1400 may be implemented as a set of instructions (e.g., an application) stored in a storage device (e.g., the storage device 150, the storage 220, and/or the storage 390). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 1400. In some embodiments, operation 1202 may be performed according to process 1400 as illustrated in FIG. 14.

As described in FIG. 12, in order to improve the quality of a reconstructed image, target weighted values in the weighing parameter (e.g., the weighing parameter w as illustrated in FIG. 12) corresponding to the projection data acquired under a large cone angle may be changed, for example, the size of w is increased, or the increase the count (or number) of data acquisition angles of corresponds to a larger weighted value, so as to achieve a better reconstruction effect of the reconstructed image. The process 1400 may be used to increase the count (or number) of data acquisition angles corresponding to larger weighted values.

In 1401, the processing device 140 may determine a first sub-range of an angle range based on the position of one or more rows of detection units in a detector. The one or more rows of detection units may acquire image data when the scanner rotates the angle range. More descriptions for the image data and the angel range may be found elsewhere in the present disclosure (e.g., FIG. 12 and the descriptions thereof).

In some embodiments, the first sub-range of angle range may refer to a range of data acquisition angles corresponding to larger weighted values (e.g., target weighted values in the weighting parameter w as described in FIG. 12 or weighted values in the second item w_cone as described in FIG. 12). When reconstructing an image, the weighted value corresponding to the center angle (e.g., 90 degrees) of the angle range (e.g., 0 to 180 degrees) may be the largest, weighted values corresponding to data acquisition angles (e.g., 80 degrees, 100 degrees) closer to the center angle (e.g., 90 degrees) may be larger than weighted values corresponding to data acquisition angles (e.g., 10 degrees, 170 degrees) away from the center angle (e.g., 90 degrees), and the weighted values corresponding to a data acquisition angle away from the center angle may increase with a difference between the data acquisition angle and the center angle of the angle range. The larger the first sub-range in the angle range is, the more data acquisition angles corresponding to the larger weighting parameter, so that the projection data corresponding to the larger weighing parameter may have a larger contribution to image reconstruction.

Figure 17:
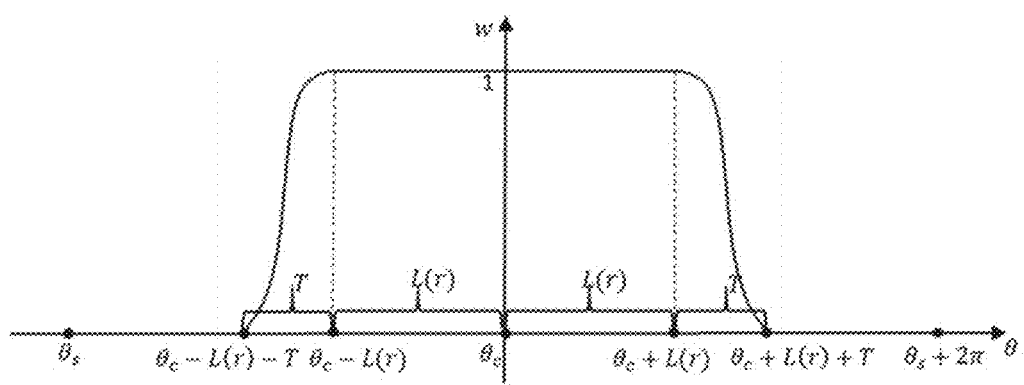
FIG. 17 is a schematic diagram of an exemplary weight function according to some embodiments of the present application.

For example, referring to FIG. 17, FIG. 17 is a schematic diagram illustrating an exemplary weighting function according to some embodiments of the present disclosure. The weighting parameter may be denoted as a weighting function as shown in FIG. 17 that shows weighted values distribution of projection data detected by detection units in one or more rows under different data acquisition angles in the angle range. As shown in FIG. 17, $\theta_c$ denotes the center angle (also referred to as a central acquisition angle) of the angle range, and $\theta_s$ denotes a starting angle of the angle range. L(r) denotes the first sub-range in the angle range, and weighted values corresponding to data acquisition angles in the first sub-range L(r) may have a larger value, for example, 1. Weighted values corresponding to data acquisition angles in other first sub-ranges may have a smaller value, for example, less than 1. T denotes a width of a transition first sub-range, and weighted values corresponding to data acquisition angles within the transition first sub-range changes monotonously with respect to the data acquisition angles.

In some embodiments, the position of the one or more rows of detection units in the detector may be represented by the z-axis coordinate values of the one or more rows of detection units or the cone angle of the one or more rows of detection units. Detection units in the same row may correspond the same z-axis coordinate value and the same cone angle. More descriptions for the detector may be found elsewhere in the present disclosure (e.g., FIG. 15 and the descriptions thereof). The first sub-range (i.e., L(r)) of the angle range may be determined based on the cone angle or z-axis coordinate value corresponding to the row of detection units. For example, the greater of the cone angle is, the larger the width of the first sub-range in the angle range may be. In some embodiments, the center of the first sub-range in the angle range may be the same as the center angle of the angle range and the processing device 140 may determine the first sub-range in the angle range based on the width of the first sub-range and the center angle.

Figure 15:
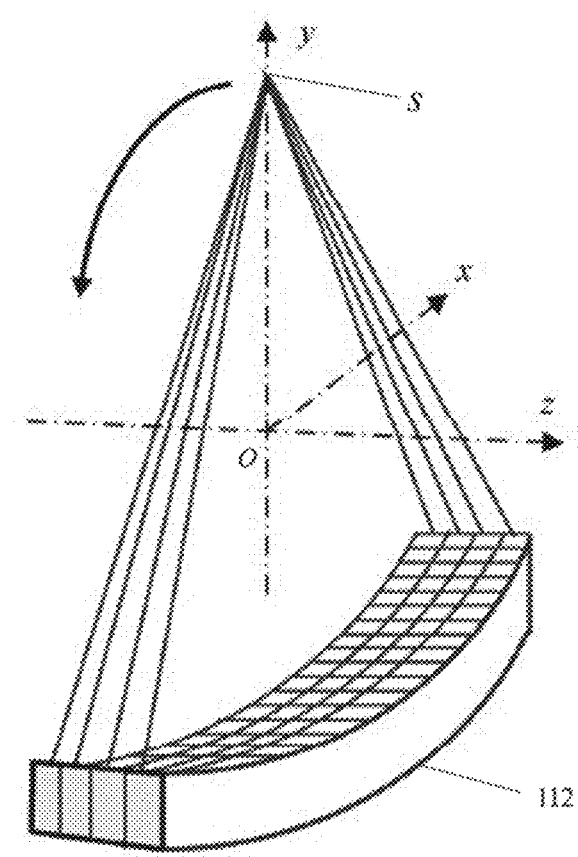
FIG. 15 is a schematic diagram of an exemplary detector according to some embodiments of the present application.
Figure 16:
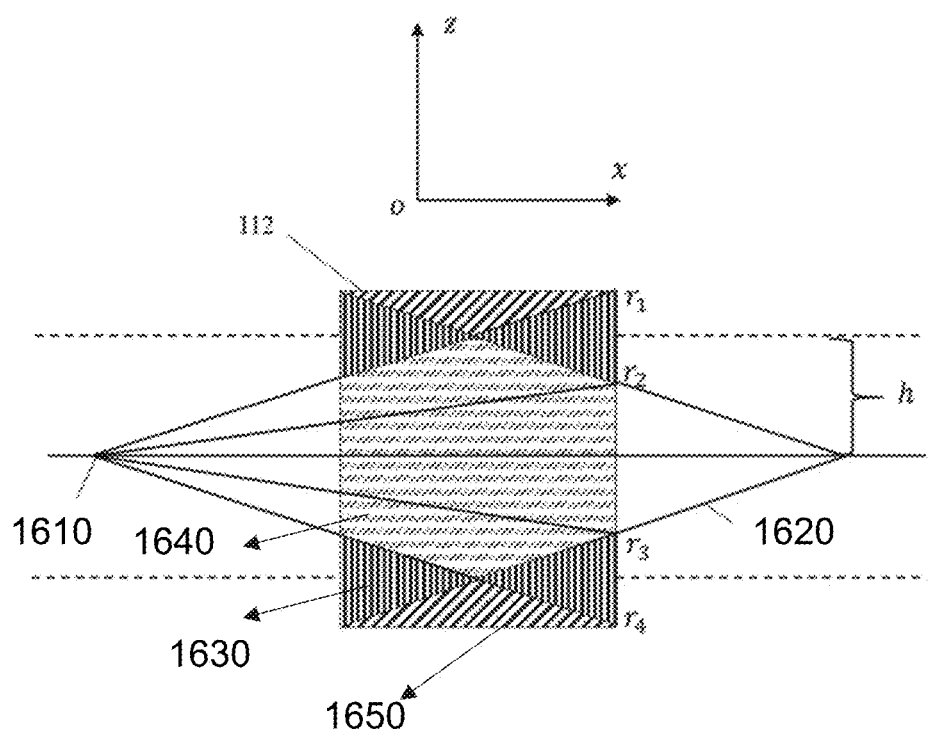
FIG. 16 is a schematic diagram of positions of detection units according to some embodiments of the present application.

For example, referring to FIG. 16, FIG. 16 is a schematic diagram illustrating positions of multiple rows of detection units according to some embodiments of the present disclosure. As shown in FIG. 16, according to the coordinate system indicated in FIG. 16, multiple rows of detection units of a detector (e.g., the detector 112 as shown in FIG. 15) may be arranged from top to bottom, i.e., z-axis as shown in FIG. 15. And detection units in the same row may have the same z-axis coordinate value. In some embodiments, the z-axis may be paralleled to the direction in which a scanning table (e.g., the scanning table 114) enters and exits a scanning/treatment hole (e.g., the detecting region 113) of the scanner (e.g., the imaging device 110). In other words, the position of a row of detection units may be represented by a z-axis coordinate value. As shown in FIG. 16, h denotes a half of a collimation width, that is, a half of a z-direction range of cone beam rays at the center of the scanning field of view (FOV). 1610 denotes a focus of a radiation scanning source (e.g., radiation source 115) and 1620 denotes radioactive rays. In this way, the detector (e.g., the detector 112) may be divided into multiple areas according to h. For illustration, FIG. 16 shows four rows of detection units r1, r2, r3, and r4. r1, r2, r3, and r4 (e.g., z-axis coordinates) may denote the positions of the four rows of detection units. Two rows of detection units with the z-axis coordinate values r1 and r4 may have the largest cone angles than rows of detection units r2 and r3. The two rows of detection units r1 and r4 may locate at the edge area of the detector. Two rows of detection units r2 and r3 are located near the middle area of the detector and the corresponding cone angles of the two rows of detection units r2 and r3 may relatively small. Therefore, an area between r1 and r2 and an area between r3 and r4 (e.g., area 1630 filled with vertical lines in FIG. 16, which may be referred to as a first area in this disclosure) may be data insufficient areas. That is to say, the projection data detected by detection units in the first areas (e.g., area 1630) may be insufficient. An area between r2 and r3 (e.g., area 1640 filled with short slashes in FIG. 16, which may be referred to as a second area in this disclosure) may be a data sufficient area. That is to say, the projection data detected by detection units in the second area (e.g., area 1640) may be sufficient. Therefore, when the projection data detected by detection units in different areas being used for image reconstruction, the first sub-ranges corresponding to detection units in different areas may be different. For the first area, the first sub-range may need to be increased to increase the count or number of data acquisition angles corresponding to a larger weighted value. For the second area, the first sub-range may be unchanged.

For example, referring to FIGS. 17 and 16, for detection units in different rows with different r values, the value of L(r) may be different. The value of L(r) (i.e., the width) of the detection units in the first area may be larger than the value of L(r) of detection units in the second area. And when the z-axis coordinate value of a row of detection units is closer to r1 and r4, the cone angle corresponding to the row of detection units may be larger, and the more serious the problem of insufficient data may be. And the L(r) may be larger to make the projection data corresponding to a larger weighted value to involve the imaging reconstruction quality. And when the z-axis coordinate value of a row of detection units is closer to r2 and r3, the cone angle corresponding to the row of detection units may be smaller. The impact of insufficient data may be small, and there is no need to increase the projection data with heavier weight to involve the following imaging reconstruction process.

In some embodiments, the first sub-range in the angle range may be determined based on the following Equation (4):

$$L(r) = \begin{cases} L_0 + (\theta_l/2 - L_0 - T) * \left(\frac{r - r_2}{r_1 - r_2}\right)^n & r \in [r_1, r_2) \\ L_0 & r \in [r_2, r_3] \\ L_0 + (\theta_l/2 - L_0 - T) * \left(\frac{r - r_3}{r_4 - r_3}\right)^n & r \in (r_3, r_4] \end{cases} \quad (4)$$

where $L_0$ refers to a half of a reference first sub-range corresponding to weighted values with a larger value (e.g., 1) using a finite angle iterative reconstruction, which is a preset value; T denotes a transition first sub-range that may be a preset value or adjusted according to different situations; $\theta_l$ denotes an extension width of the cone angle of a row of detection units at the most edge of the detector (e.g., r1 or r4 as shown in FIG. 16); r denotes the z-axis coordinate value of one or more rows of detection units; and n denotes a preset value that may be adjusted according to different situations. The extension width of the cone angle of a row of detection units $\theta_l$ may be used to control the form of the extension angle of a larger cone angle. The extension width of the cone angle of a row of detection units $\theta_l$ may be a preset value, such as $2\pi$.

According to Equation (4), when r is between r2 and r3, e.g., the one or more rows of detection units are located in the second area as shown in FIG. 16, projection data collected by the one or more rows of detection units may be sufficient, and there is no need to adjust (e.g., increase) the first sub-range in the angle range. When r is between r1 and r2, or between r3 and r4, that is, the one or more rows of detection units are located in the first area as shown in FIG. 16, the projection data collected by the one or more rows of detection units may be insufficient, and the first sub-range in the angle range may be adjusted (i.e., increased) so that the weighted values of projection data corresponding to more data acquisition angles in the first sub-range may be larger, and the projection data may also participate more in image reconstruction, i.e., provide more contribution in the image reconstruction.

In 1402, the processing device 140 may determine a second sub-range in the angle range based on the first sub-range and the center angle of the angel range. Operation 1402 may be performed by the weighting parameter determination module 406.

In some embodiments, the second sub-range may include the first sub-range, the transition sub-range, and other sub-ranges other than the first sub-range and the transition sub-range described in operation 1401. The processing device 140 may determine the second sub-range based on differences between data acquisition angles in the angle range and the center acquisition angle. Combined with FIG. 17, when the difference between a data acquisition angle and the center acquisition angle does not exceed L(r), the data acquisition angle is within the first sub-range, i.e., the second sub-range is the first sub-range. When the difference between a data acquisition angle and the center acquisition angle exceeds L(r) and does not exceed L(r)+T, the data acquisition angle may be within the transition sub-range, i.e., the second sub-range is the transition sub-range. When the difference between a data acquisition angle and the center acquisition angle exceeds L(r)+T, the data acquisition angle may be within other sub-ranges in the angle range, i.e., the second sub-range may include other sub-ranges other than the first sub-range and the transition sub-range described in operation 1401.

In 1403, the processing device 140 may determine weighted values in a correction factor each of which corresponds to a data acquisition angle in the angle range based on the second sub-range. Operation 1402 may be performed by the weighting parameter determination module 406.

In some embodiments, the correction factor may be the second item as shown in Equation (2) as illustrated in FIG. 12. In some embodiments, the processing device 140 may obtain the transition sub-range. For example, the transition sub-range may be a preset value or an adjusted value adjusted according to specific conditions. Thereafter, the processing device 140 may determine the correction factor based on the following Equation (5):

$$w_{cone}(r, \theta) = \begin{cases} 0 & |\theta - \theta_c| \geq L(r) + T \\ \cos^k\left(\frac{|\theta - \theta_c| - L(r)}{T} * \frac{\pi}{2}\right) & L(r) < |\theta - \theta_c| < L(r) + T \\ 1 & |\theta - \theta_c| \leq L(r) \end{cases} \quad (5)$$

where $\theta$ denotes the value of a data acquisition angle; k denotes a parameter configured to adjust the value of a weight function (i.e., the weighting parameter as described in FIG. 12) in the transition sub-range. k may be set as, for example, 0, 2, 5, etc. k may affect the steepness of the curve of the weighting function in the transition sub-range, thereby affecting the transition sub-range T. When a data acquisition angle is within the first sub-range, that is, when the difference between the data acquisition angle and the center angle does not exceed the first sub-range ($|\theta - \theta_c| \leq L(r)$), the weighted value in the correction factor corresponding to the data acquisition angle may be set to a larger value, such as 1; when the data acquisition angle is in other ranges except the first sub-range and the transition sub-range, that is, when the difference between the data acquisition angle and the center angle exceeds the sum of the first sub range and the transition sub-range ($|\theta - \theta_c| \geq L(r) + T$), the weighted value in the correction factor corresponding to the data acquisition angle may be a smaller value, such as 0; when a data acquisition angle is within the transition sub-range, that is, when the difference between the data acquisition angle and the center angle exceeds the first sub-range but does not exceed the sum of the first sub-range and the transition sub-range ($L(r) < |\theta - \theta_c| < L(r) + T$), the weighted value in the correction factor corresponding to the data acquisition angle may be in a range between the larger value and the smaller value, such as a range (0, 1).

In 1404, the processing device 140 may determine a weighting parameter corresponding to the angle range based on the correction factor. Operation 1402 may be performed by the weighting parameter determination module 406.

In some embodiments, the processing device 140 may designate the correction factor as the weighting parameter corresponding to the angle range.

In some embodiments, the processing device 140 may determine the weighting parameter based on the correction factor and a preliminary weighting parameter. The preliminary weighting parameter may be found elsewhere in the present disclosure (e.g., FIG. 12 and the descriptions thereof). For example, the processing device 140 may designate a product between the preliminary weighting parameter and the correction factor as the weighting parameter.

Due to the widening of the first sub-range, the projection data corresponding to larger weighted values in the weight parameter that are collected by the detection units in the first area may be increased. In this way, the problem of insufficient data caused by the large cone angle may be suppressed with improved efficiency. The projection data collected by the detection units in the second area may be sufficient, and no change is made when the weighting parameter is calculated, so on the other hand, it will not affect the image reconstruction when the projection data is sufficient.

It should be noted that the above description regarding the process 1400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. Additionally, the order in which the operations of the process 1400 described above is not intended to be limiting. For example, the process 1400 may include an additional operation in which the processing device 140 may store the weighting parameter. As another example, operations 1401 and 1402 may be integrated into one single operation.

FIG. 15 is a schematic diagram illustrating an exemplary detector according to some embodiments of the present disclosure. As shown in FIG. 15, each rectangular block in the detector may represent a detection unit. The detection units may be arranged in sequence to form a plurality of rows. The detection units in each row may be arranged along an x-axis of a coordinate system as shown in FIG. 15. The plurality of rows may be arranged along a z-axis of the coordinate system. In some embodiments, the z-axis may be parallel to a direction in which a scanning table (e.g., the scanning table 114) enters and exits the scanning/treatment hole (e.g., the detecting region 113) in a scanner (e.g., the imaging device 110). The greater the count or number of the plurality of rows included in the detector is, the greater the width of the detector may be, the greater the scanning range of one scan may be, and the shorter the scanning time for one full scan (e.g., a full-body scan of a patient) of the subject may be. S denotes the focal of the radiation source (e.g., the radiation source 115), and O denotes the isocenter of the scanner (e.g., imaging device 110). The radioactive rays emitted from S may be received by the plurality of rows of detection units in the detector after passing through the subject. Each row may receive a fan-shaped ray beam. An angle formed between the plane the fan-shaped ray beam belonged to and a center plane of the cone beam (that is, the x-o-y plane) may be referred to as the cone angle corresponding to the row of detection units.

FIG. 18 illustrates reconstructed images according to some embodiments of the present disclosure. As shown in FIG. 18, Image 1 was reconstructed based on projection data acquired by detection units in one or more rows with a larger cone angle using a traditional image reconstruction technique and Image 2 was reconstructed based on the projection data that is the same as Image 1 according to process 1200, 1300, and/or 1400 as disclosed in the present disclosure. Image 3 was reconstructed based on projection data acquired by detection units in one or more rows with a smaller cone angle using a traditional image reconstruction technique and Image 4 was reconstructed based on the projection data that is the same as Image 3 according to process 1200, 1300, and/or 1400 as disclosed in the present disclosure.

According to a comparison between Image 1 and Image 2, the image quality of Image 2 is better than Image 1. According to a comparison between Image 3 and Image 4, the image quality of Image 3 is same as or similar to Image 4. Accordingly, using the reconstruction technique described in the present disclosure (e.g., process 1200), the image quality may be significantly improved for images reconstructed based on projection data acquired by detection units with a larger cone angle (e.g., located at the edge area of the detector), and the image quality may be not decreased for images reconstructed based on projection data acquired by detection units with a smaller cone angle (e.g., located at the middle area of the detector).

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification is provided for illustration purposes and modified according to different situations. For example, a classification condition that "a probability value is greater than the threshold value" may further include or exclude a condition that "the probability value is equal to the threshold value".

What is claimed is:

1. A system for imaging reconstruction, comprising:
at least one storage device including a set of instructions; and
at least one processor configured to communicate with the at least one storage device, wherein when executing the set of instructions, the at least one processor is configured to direct the system to perform operations including:
obtaining a first set of image data of a subject acquired by a scanner, the first set of image data corresponding to a first angle range of the scanner;
obtaining a second set of image data of the subject acquired by the scanner, the second set of image data corresponding to a second angle range of the scanner, wherein the first angle range is different from the second angle range;
generating, based on the first set of image data, a first image via a first iterative process including performing a first count of iterations;
generating, based on the second set of image data, a second image via a second iterative process including performing a second count of iterations, wherein a first parameter of the first iterative process is different from a second parameter of the second iterative process, and the first count of iterations exceeds the second count of iterations; and
generating, based on the first image and the second image, a target image.

2. The system of claim 1, wherein the operations further include:
obtaining image data of the subject acquired by a radiation source of the scanner rotating an angle range, the first angle range and the second angle range being portions of the angle range, and the first set of image data and the second set of image data being portions of the image data.

3. The system of claim 1, wherein the generating, based on the first image and the second image, a target image comprises:
generating a first intermediate image by performing an image arithmetic between the first image and the second image; and
generating the target image based on the first intermediate image and at least one of the first image or the second image.

4. The system of claim 3, wherein the generating, based on the first image and the first intermediate image, a target image further comprises:

generating a second intermediate image based on a noise distribution adjustment operation and the first intermediate image; and
generating the target image based on the first image and the second intermediate image.

5. The system of claim 4, wherein the generating a second intermediate image by performing a noise distribution adjustment operation on the first intermediate image comprises:
obtaining a weighting parameter corresponding to the first intermediate image, the weighting parameter including a plurality of elements each of which corresponds to a pixel of the first intermediate image; and
generating the second intermediate image by multiplying the weighting parameter and the first intermediate image.

6. The system of claim 4, wherein the generating a second intermediate image based on a noise distribution adjustment operation and the first intermediate image comprises:
generating a third intermediate image by processing the first intermediate image using a high-pass filter; and
generating the second intermediate image by performing the noise distribution adjustment operation on the third intermediate image.

7. The system of claim 4, the generating a second intermediate image based on a noise distribution adjustment operation and the first intermediate image further comprises:
generating a fourth intermediate image by performing a blurring operation on the first intermediate image;
generating a fifth intermediate image by performing the image arithmetic between the first intermediate image and the fourth intermediate image; and
generating the second intermediate image by performing the noise distribution adjustment operation on the fifth intermediate image.

8. The system of claim 7, wherein the blurring operation includes a total variation (TV) denoising operation.

9. The system of claim 3, wherein the image arithmetic includes at least one of an addition operation, an image subtraction operation, a multiplication operation, or a division operation.

10. The system of claim 1, wherein a time resolution corresponding to the first image exceeds a time resolution corresponding to the second image and a time resolution corresponding to the target image exceeds the time resolution corresponding to the second image.

11. The system of claim 1, wherein a noise level of the first image is less than a noise level of the second image and a noise level of the target image is less than the noise level of the second image.

12. The system of claim 1, wherein a width of the second angle range exceeds a width of the first angle range.

13. A method for imaging reconstruction, comprising:
obtaining a first set of image data of a subject acquired by a scanner, the first set of image data corresponding to a first angle range of the scanner;
obtaining a second set of image data of the subject acquired by the scanner, the second set of image data corresponding to a second angle range of the scanner, wherein the first angle range is different from the second angle range;
generating, based on the first set of image data, a first image via a first iterative process including performing a first count of iterations;
generating, based on the second set of image data, a second image, via a second iterative process including performing a second count of iterations, wherein a first parameter of the first iterative process is different from a second parameter of the second iterative process, and the first count of iterations exceeds the second count of iterations; and generating, based on the first image and the second image, a target image.

14. The method of claim 13, further including:

obtaining image data of the subject acquired by a radiation source of the scanner rotating an angle range, the first angle range and the second angle range being portions of the angle range, and the first set of image data and the second set of image data being portions of the image data.

15. The method of claim 13, wherein the generating, based on the first image and the second image, a target image comprises:

generating a first intermediate image by performing an image arithmetic between the first image and the second image; and generating the target image based on the first intermediate image and at least one of the first image or the second image.

16. The method of claim 15, wherein the generating, based on the first image and the first intermediate image, a target image further comprises:

generating a second intermediate image based on a noise distribution adjustment operation and the first intermediate image; and generating the target image based on the first image and the second intermediate image.

17. The method of claim 16, wherein the generating a second intermediate image by performing a noise distribution adjustment operation on the first intermediate image comprises:

obtaining a weighting parameter corresponding to the first intermediate image, the weighting parameter including a plurality of elements each of which corresponds to a pixel of the first intermediate image; and generating the second intermediate image by multiplying the weighting parameter and the first intermediate image.

18. The method of claim 16, wherein the generating a second intermediate image based on a noise distribution adjustment operation and the first intermediate image comprises:

generating a third intermediate image by processing the first intermediate image using a high-pass filter; and generating the second intermediate image by performing the noise distribution adjustment operation on the third intermediate image.

* * * * *